(12) United States Patent
Doihara et al.

(10) Patent No.: US 9,212,742 B2
(45) Date of Patent: Dec. 15, 2015

(54) CONTROLLER AND CONTROL METHOD OF BELT-TYPE CONTINUOUSLY VARIABLE TRANSMISSION

(75) Inventors: Katsumi Doihara, Fuji (JP); Yoshihisa Kodama, Fuji (JP); Yasuaki Yoshikawa, Fuji (JP)

(73) Assignees: NISSAN MOTOR CO., LTD., Yokohama-Shi (JP); JATCO LTD, Fuji-Shi (JP)

( * ) Notice: Subject to any disclaimer, the term of this patent is extended or adjusted under 35 U.S.C. 154(b) by 481 days.

(21) Appl. No.: 13/266,808

(22) PCT Filed: Apr. 30, 2009

(86) PCT No.: PCT/JP2009/058477
§ 371 (c)(1),
(2), (4) Date: Jan. 9, 2012

(87) PCT Pub. No.: WO2010/125676
PCT Pub. Date: Nov. 4, 2010

(65) Prior Publication Data
US 2012/0108390 A1    May 3, 2012

(51) Int. Cl.
| | |
|---|---|
| *B60W 10/107* | (2012.01) |
| *F16H 61/662* | (2006.01) |
| *B60W 10/06* | (2006.01) |
| *B60W 30/184* | (2012.01) |

(52) U.S. Cl.
CPC ......... *F16H 61/66272* (2013.01); *B60W 10/06* (2013.01); *B60W 10/107* (2013.01); *B60W 30/1846* (2013.01); *F16H 2061/66277* (2013.01); *Y10T 477/6242* (2015.01)

(58) Field of Classification Search
None
See application file for complete search history.

(56) References Cited

U.S. PATENT DOCUMENTS

| | | | |
|---|---|---|---|
| 4,649,486 | A | 3/1987 | Oshiage |
| 4,735,597 | A | 4/1988 | Cadee |
| 5,766,105 | A | 6/1998 | Fellows et al. |

(Continued)

FOREIGN PATENT DOCUMENTS

| | | |
|---|---|---|
| CN | 1657803 A | 8/2005 |
| EP | 12369635 A2 | 9/2002 |

(Continued)

OTHER PUBLICATIONS

U.S. Appl. No. 13/266,804, filed Oct. 28, 2011, Doihara et al.

(Continued)

*Primary Examiner* — Erin D Bishop
(74) *Attorney, Agent, or Firm* — Foley & Lardner LLP

(57) ABSTRACT

A control method for a belt-type continuously variable transmission is provided for performing a belt slip control. The method includes oscillating hydraulic pressure and monitoring a phase difference calculated based on a multiplication value of an oscillation component in an actual hydraulic pressure and an oscillation component in an actual variable speed ratio to estimate a belt slip condition. The method further includes controlling hydraulic pressure to maintain a predetermined belt slip condition by reducing the hydraulic pressure to be lower than a hydraulic pressure in a normal control time based on an estimation, and limiting an input torque-change rate in which an input torque to the belt-type continuously variable transmission changes in an increasing direction until the hydraulic pressure rises to a hydraulic pressure in which the input torque is not excessive relative to a belt clamp force.

2 Claims, 15 Drawing Sheets

(56) References Cited

U.S. PATENT DOCUMENTS

| | | |
|---|---|---|
| 7,179,196 B2 | 2/2007 | Oshita et al. |
| 7,189,184 B2 | 3/2007 | Oshiumi et al. |
| 7,774,120 B2 | 8/2010 | Yamaguchi et al. |
| 7,819,764 B2 | 10/2010 | Kimura et al. |
| 7,892,141 B2 | 2/2011 | Yamaguchi et al. |
| 8,133,140 B2 | 3/2012 | Yamaguchi et al. |
| 8,221,286 B2 * | 7/2012 | Van Der Noll ............. 477/44 |
| 8,600,634 B2 | 12/2013 | Van Der Sluid et al. |
| 2002/0155910 A1 | 10/2002 | Nishizawa et al. |
| 2004/0242355 A1 | 12/2004 | Yamaguchi et al. |
| 2005/0181909 A1 | 8/2005 | Oshiumi et al. |
| 2007/0197320 A1 | 8/2007 | Kimura et al. |
| 2007/0232424 A1 | 10/2007 | Nishida |
| 2008/0146409 A1 | 6/2008 | Yamaguchi et al. |
| 2012/0252612 A1 | 10/2012 | Kodama et al. |
| 2012/0258825 A1 | 10/2012 | Kodama et al. |

FOREIGN PATENT DOCUMENTS

| | | |
|---|---|---|
| EP | 1 329 650 A2 | 7/2003 |
| EP | 1698805 A2 | 9/2006 |
| EP | 1818572 A1 | 8/2007 |
| JP | 04-013575 A | 3/1992 |
| JP | 04-013575 B2 | 3/1992 |
| JP | 2003-65428 A | 3/2003 |
| JP | 2003-202075 A | 7/2003 |
| JP | 2003-236509 A | 8/2003 |
| JP | 2004-293652 A | 10/2004 |
| JP | 2004-316860 A | 11/2004 |
| JP | 2004-358999 A | 12/2004 |
| JP | 2005-030511 A | 2/2005 |
| JP | 2006-511765 A | 4/2006 |
| JP | 2006-511766 A | 4/2006 |
| JP | 2007-211855 A | 8/2007 |
| JP | 2008-151198 A | 7/2008 |
| RU | 2 012 833 C1 | 5/1994 |
| RU | 2 133 895 C1 | 7/1999 |
| SU | 1454242 A3 | 1/1989 |
| SU | 1682691 A1 | 10/1991 |
| WO | WO 2009/007450 A2 | 1/2009 |

OTHER PUBLICATIONS

U.S. Appl. No. 13/266,816, filed Oct. 28, 2011, Doihara et al.
U.S. Appl. No. 13/266,823, filed Oct. 28, 2011, Doihara et al.
U.S. Appl. No. 13/266,830, filed Oct. 28, 2011, Doihara et al.
K. Doihara, U.S. PTO Official Action, U.S. Appl. No. 13/266,823, dated May 2, 2014, 17 pages.
K. Doihara, U.S. PTO Official Action, U.S. Appl. No. 13/266,804, dated May 9, 2014, 14 pages.
K. Doihara, U.S. PTO Official Action, U.S. Appl. No. 13/266,816, dated May 29, 2014, 20 pages.
K. Doihara, U.S. PTO Notice of Allowance, U.S. Appl. No. 13/266,830, dated May 27, 2014, 18 pages.
Russian Office Action with English Translation, dated Mar. 5, 2013, 15 pages.
K. Doihara, U.S. PTO Notice of Allowance, U.S. Appl. No. 13/266,804, dated Jul. 17, 2014, 9 pages.
K. Doihara, U.S. PTO Notice of Allowance, U.S. Appl. No. 13/266,816, dated Aug. 21, 2014, 11 pages.
K. Doihara, U.S. PTO Notice of Allowance, U.S. Appl. No. 13/266,823, dated Aug. 18, 2014, 11 pages.

* cited by examiner

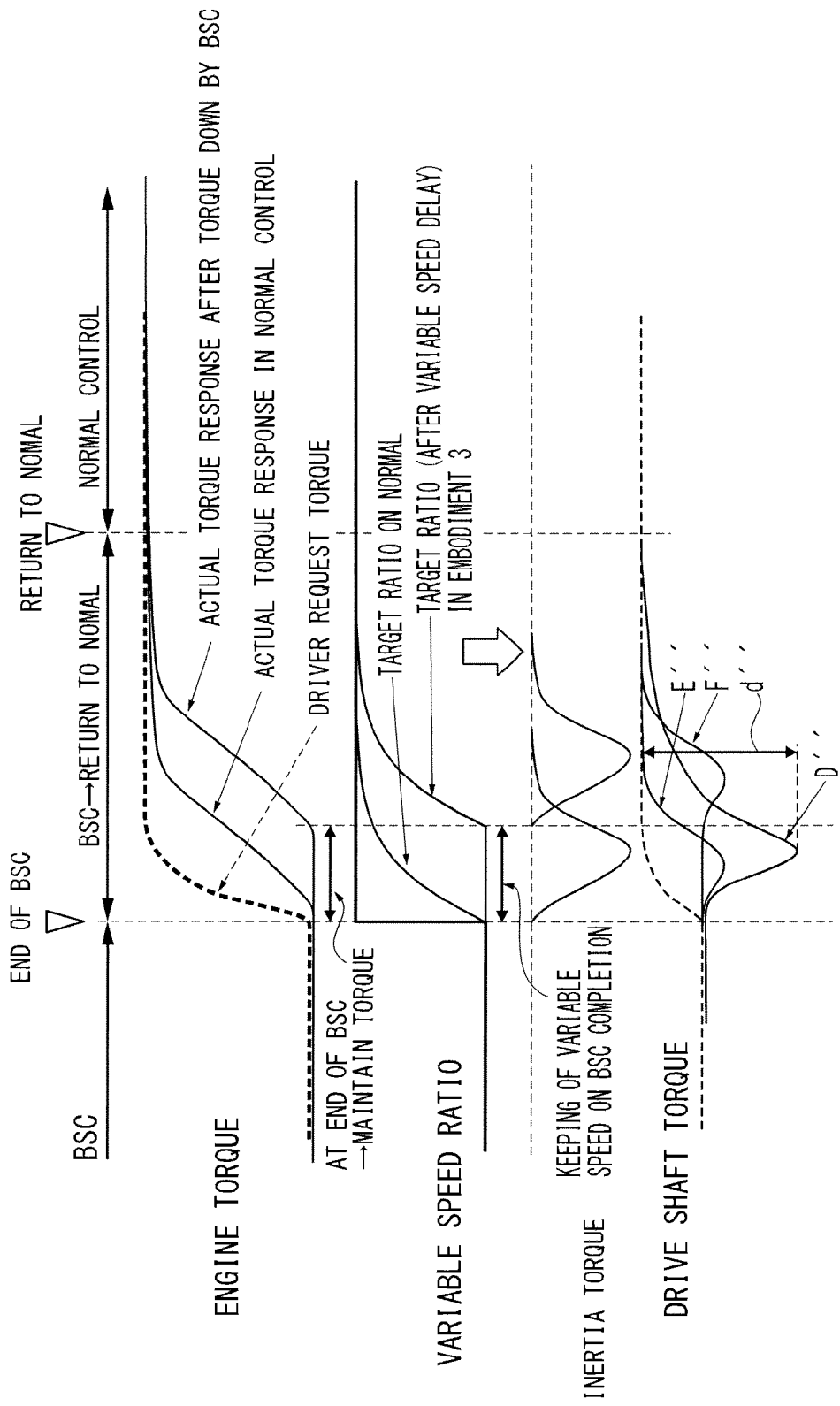

CONTROLLER AND CONTROL METHOD OF BELT-TYPE CONTINUOUSLY VARIABLE TRANSMISSION

TECHNICAL FIELD

The present invention relates to a device and a method for controlling a belt-type continuously variable transmission to perform a belt slip control in which a belt wound around pulleys is slipped at a predetermined slip rate.

BACKGROUND ART

There is known a conventional belt-type continuously variable transmission controller in which an actual secondary hydraulic pressure is controlled based on a multiplier of an oscillation component included in the actual secondary hydraulic pressure and an oscillation component included in a variable speed ratio, when performing a belt slip control slipping a belt wound around pulleys at a predetermined slip rate by setting the actual secondary hydraulic pressure to be lower than a hydraulic pressure during a normal control. This eliminates the necessity for directly detecting the belt slip rate and thereby facilitates the belt slip control (see Patent Document 1, for example).

PRIOR ART DOCUMENT

Patent Document

Patent Document 1: WO 2009/007450 A2 (PCT/EP2008/059092)

SUMMARY OF THE INVENTION

Problems to be Solved by the Invention

However, in such a conventional belt-type continuously variable transmission controller, because a method for returning from the belt slip control to the normal control is not considered, there is possibility of generating the following problem.

That is to say, although, when returning from the belt slip control to the normal control, the actual secondary hydraulic pressure is increased from a hydraulic pressure during the belt slip control to a hydraulic pressure during the normal control, when an input torque to the belt-type continuously variable transmission controller rapidly changes in an increasing direction, while the actual secondary hydraulic pressure is increased to the hydraulic pressure at the normal control, the input torque to the belt-type continuously variable transmission controller is excessive relative to a belt clamp force, there is possibility of generating a belt slip.

The present invention is made in view of the above problem and it is an object thereof to provide a control device and a control method for a belt-type continuously variable transmission capable of preventing a belt from slipping by inhibiting an input torque to the belt-type continuously variable transmission controller is excessive relative to a belt clamp force when the belt-type continuously variable transmission is returned from a belt slip control to a normal control.

Means to Solve the Problem

To accomplish the above object, a control device for a belt-type continuously variable transmission according to the present invention includes a primary pulley for receiving an input from a drive source, a secondary pulley for providing an output to a drive wheel, and a belt wound around the primary pulley and the secondary pulley, to control a variable speed ratio determined by a running radius ratio of the belt on the pulleys by controlling a primary hydraulic pressure to the primary pulley and a secondary hydraulic pressure to the secondary pulley. The control device for the belt-type continuously variable transmission according to the present invention includes a belt slip control means to perform a belt slip control holding a predetermined belt slip condition by reducing an actual secondary hydraulic pressure to be lower than that in the time of a normal control; and a normal control-return control means to limit an input torque-change rate in which an input torque to the belt-type continuously variable transmission changes in an increasing direction until the hydraulic pressure rises to a hydraulic pressure in which the input torque to the belt-type continuously variable transmission is not excessive relative to a belt clamp force, when returning from the belt slip control to the normal control by an increment in the input torque to the belt-type continuously variable transmission, the limitation being performed for a predetermined period from an initiation of the return.

Effects of the Invention

Consequently, according to the control device for the belt-type continuously variable transmission, when returning from the belt slip control to the normal control, the input torque-change rate in which the input torque to the belt-type continuously variable transmission changes in the increasing direction is restricted for a predetermined period from the return initiation in the normal control-return control means. In other words, because a control to slip positively a belt in an allowable slip range is performed in the belt slip control, the belt clamp force is in a state lower than that in the normal control time. When returning from the belt slip control to the normal control, if the input torque to the belt-type continuously variable transmission is changed in the increasing direction, there is possibility that the input torque exceeds the belt clamp force and therefore an excessive belt slip occurs. On the contrary, when returning from the belt slip control to the normal control, by limiting the input torque-change rate changing in the increasing direction during a period from an initiation of the returning until a predetermined time and inhibiting an increment in the input torque, it is restricted that the input torque to the belt-type continuously variable transmission becomes excessive relative to the belt clamp force in a period between the time of the belt slip control completion at which the belt clamp force reduces compared to the normal control time and a time at which the belt clamp force recovers by the increment of the actual secondary hydraulic pressure. Consequently, when returning from the belt slip control to the normal control, it is restricted that the input torque to the belt-type continuously variable transmission is excessive relative to the belt clamp force, thereby it is possible to prevent the belt slip from occurring.

BRIEF DESCRIPTION OF THE DRAWINGS

FIG. 21 is a time chart showing a characteristic of each of an engine torque, a target primary revolution, an inertia torque, and a drive shaft torque by a torque delay and a variable speed delay adopted in a return control in the embodiment 3.

MODE FOR CARRYING OUT THE INVENTION

Hereinafter, a best mode to carry out a control device and a control method for a belt-type continuously variable transmission will be described based on embodiments 1 to 3 with reference to the accompanying drawings.

Embodiment 1

Figure 1:
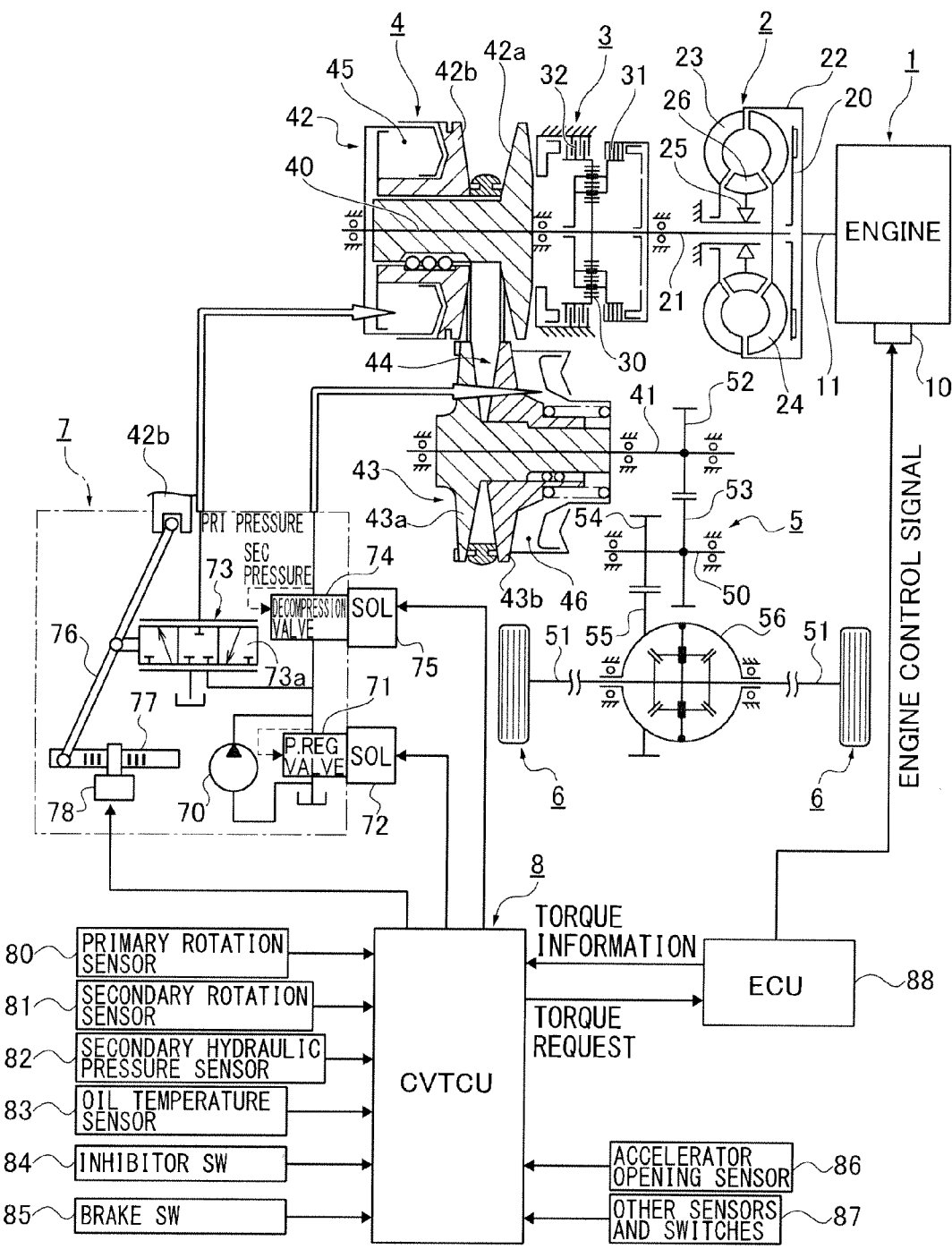
FIG. 1 is a system view showing entirely a drive system and a control system of a vehicle incorporating a belt-type continuously variable transmission applied with a control device and a control method according to an embodiment 1.
Figure 2:
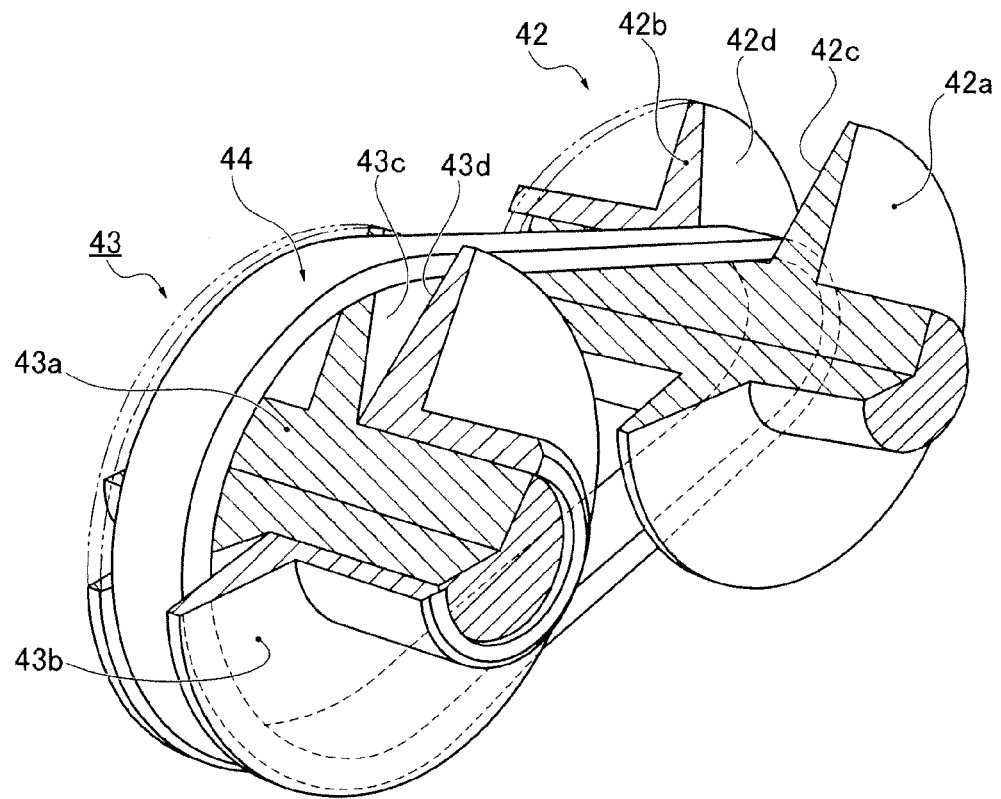
FIG. 2 is a perspective view showing the belt-type continuously variable transmission mechanism applied with the control device and the control method according to the embodiment 1.
Figure 3:
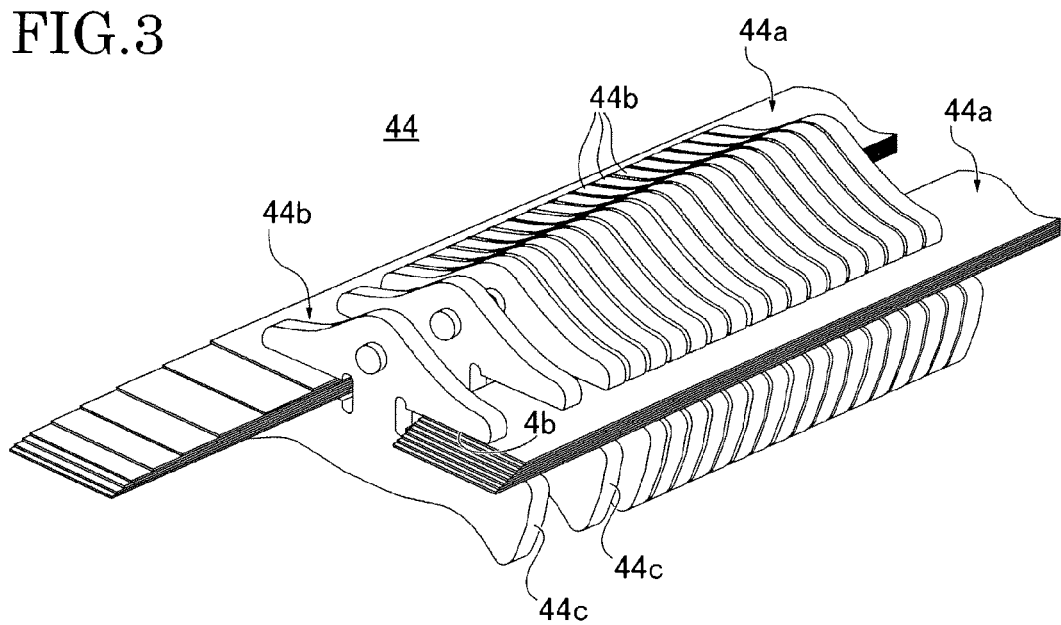
FIG. 3 is a perspective view showing a part of a belt of the belt-type continuously variable transmission mechanism applied with the control device and the control method according to the embodiment 1.

First, a structure of the device is described. FIG. 1 shows the entire system of a drive system and a control system of a vehicle incorporating a belt-type continuously variable transmission mechanism 4 applied with a control device and a control method according to the embodiment 1. FIG. 2 is a perspective view of the belt-type continuously variable transmission mechanism 4 applied with a control device and a control method according to the embodiment 1. FIG. 3 is a perspective view of a part of a belt of the belt-type continuously variable transmission mechanism applied with the control device and the control method according to the embodiment 1. In the following system structures are described with reference to FIGS. 1 to 3.

In FIG. 1, the drive system of a vehicle incorporating the belt-type continuously variable transmission comprises an engine 1, a torque converter 2, a forward/backward drive switch mechanism 3, a belt-type continuously variable transmission mechanism 4, a final reduction mechanism 5 and drive wheels 6, 6.

The output torque of the engine 1 is controllable by an engine control signal supplied from an exterior in addition to by a driver's acceleration operation. The engine 1 includes an output torque control actuator 10 to control an output torque by a throttle valve opening/closing operation, a fuel cut operation and else.

The torque converter 2 is a startup element with a torque increasing function and includes a lockup clutch 20 to be able to directly connect an engine output shaft 11 (=torque converter input shaft) and a torque converter output shaft 21. The torque converter 2 is comprised of a turbine runner 23 connected with the engine output shaft 11 via a converter housing 22, an impeller pump 24 connected with the torque converter output shaft 21, and a stator 26 provided via a one-way clutch 25.

The forward/backward drive switch mechanism 3 is to switch a rotary direction input to the belt-type continuously variable transmission mechanism 4 between a normal rotary direction during forward traveling and a reverse rotary direction during backward traveling. The forward/backward switch mechanism 3 includes a double pinion planetary gear 30, a forward clutch 31, and a backward brake 32. A sun gear of the double pinion planetary gear 30 is connected with the torque converter output shaft 21 and a carrier thereof is connected with a transmission input shaft 40. The forward clutch 31 is fastened during a backward traveling to fix a ring gear of the double pinion planetary gear 30 to the case.

The belt-type continuously variable transmission mechanism 4 has a continuously variable transmission function to steplessly vary the gear ratio by changing a belt contact radius. A variable speed ratio is a ratio of the input revolution rate of the transmission input shaft 40 and the output revolution rate of the transmission output shaft 41. The belt-type continuously variable transmission mechanism 4 includes a primary pulley 42, a secondary pulley 43, and a belt 44. The primary pulley 42 is made up of a fixed pulley 42a and a slide pulley 42b. The slide pulley 42b is slid by primary hydraulic pressure introduced into a primary hydraulic pressure chamber 45. The secondary pulley 43 is made up of a fixed pulley 43a and a slide pulley 43b. The slide pulley 43b is slid by primary hydraulic pressure introduced into a secondary hydraulic pressure chamber 46. The belt 44 as shown in FIG. 2 is wound around V-shaped sheave faces 42c, 42d of the primary pulley 42 and V-shaped sheave faces 43c, 43d of the secondary pulley 43. In FIG. 3 the belt 44 is formed of two laminated rings 44a, 44a of which a large number of rings are layered from inside to outside as well as a large number of elements 44b of press-cut plates placed between the two laminated rings 44a, 44a and connected with each other in a ring-form. The elements 44b each includes, at both sides, flank faces 44c, 44c to contact with the sheave faces 42c, 42d of the primary pulley 42 and the sheave faces 43c, 43d of the secondary pulley 43.

The final reduction mechanism 5 decelerates the transmission output revolution from the transmission output shaft 41 of the belt-type continuously variable transmission mechanism 4 and provides a differential function thereto to transmit it to the right and left drive wheels 6, 6. The final reduction mechanism 5 is interposed among the transmission output shaft 41, an idler shaft 50, right and left drive shafts 51, 51, and includes a first gear 52, a second gear 53, a third gear 54, and a fourth gear 55 with a deceleration function and a gear differential gear 56 with a differential function.

The control system for the belt-type continuously variable transmission comprises a transmission hydraulic pressure control unit 7 and a CVT control unit 8, as shown in FIG. 1.

The transmission hydraulic pressure control unit 7 is a hydraulic pressure control unit to produce primary hydraulic pressure introduced into the primary hydraulic pressure chamber 45 and secondary hydraulic pressure introduced into the secondary hydraulic pressure chamber 46. The transmission hydraulic pressure control unit 7 comprises an oil pump 70, a regulator valve 71, a line pressure solenoid 72, a transmission control valve 73, a decompression valve 74, a secondary hydraulic pressure solenoid 75, a servo link 76, a transmission command valve 77, and a step motor 78.

The regulator valve 71 uses discharged pressure from the oil pump 70 as a pressure source to adjust line pressure PL. The regulator valve 71 includes the line pressure solenoid 72 to adjust the pressure of oil from the oil pump 70 to a predetermined line pressure PL in response to a command from the CVT control unit 8.

The transmission control valve 73 uses the line pressure PL produced by the regulator valve 71 as a pressure source to adjust the primary hydraulic pressure introduced into the primary hydraulic pressure chamber 45. A spool 73a of the transmission control valve 73 is connected with the servo link 76 constituting a mechanical feedback mechanism and the transmission command valve 77 connected with one end of the servo link 76 is driven by the step motor 78 so that the transmission control valve receives feedback of a slide position (actual pulley ratio) from the slide pulley 42b of the primary pulley 42 connected with the other end of the servo link 76. That is, during transmission or variable speed, when the step motor 78 is driven in response to a command from the CVT control unit 8, the spool 73a of the transmission control valve 73 is changed in position to supply/discharge the line pressure PL to/from the primary hydraulic pressure chamber 45 to adjust the primary hydraulic pressure to acquire a target gear ratio commanded at the drive position of the step motor 78. Upon completion of the transmission, the spool 73a is held at a closed position in response to a displacement of the servo link 76.

The decompression valve 74 uses the line pressure PL produced by the regulator valve 71 as a pressure source to adjust the secondary hydraulic pressure introduced into the secondary hydraulic pressure chamber 46 by decompression. The decompression valve 74 comprises the secondary hydraulic pressure solenoid 75 to decompress the line pressure PL to a command secondary hydraulic pressure in accordance with a command from the CVT control unit 8.

The CVT control unit 8 is configured to perform various control such as a gear ratio control to output to the step motor 78 a control command to acquire a target gear ratio in accordance with vehicle speed, throttle opening level and else, a line pressure control to output to the line pressure solenoid 72 a control command to acquire a target line pressure in accordance with the throttle opening level or else, a secondary hydraulic pressure control to output to the secondary hydraulic pressure solenoid 75 a control command to acquire a target secondary pulley thrust in accordance with transmission input torque or else, a forward and backward switch control to control the fastening and release of the forward clutch 31 and backward brake 32, and a lockup control to control fastening and release of the lockup clutch 20. The CVT control unit 8 receives various sensor information and switch information from a primary revolution sensor 80, a secondary revolution sensor 81, a secondary hydraulic pressure sensor 82, an oil temperature sensor 83, an inhibitor switch 84, a brake switch 85, an accelerator opening sensor 86, and other sensors and switches 87. Further, it receives torque information from an engine control unit 88 and outputs a torque request to the engine control unit 88.

Figure 4:
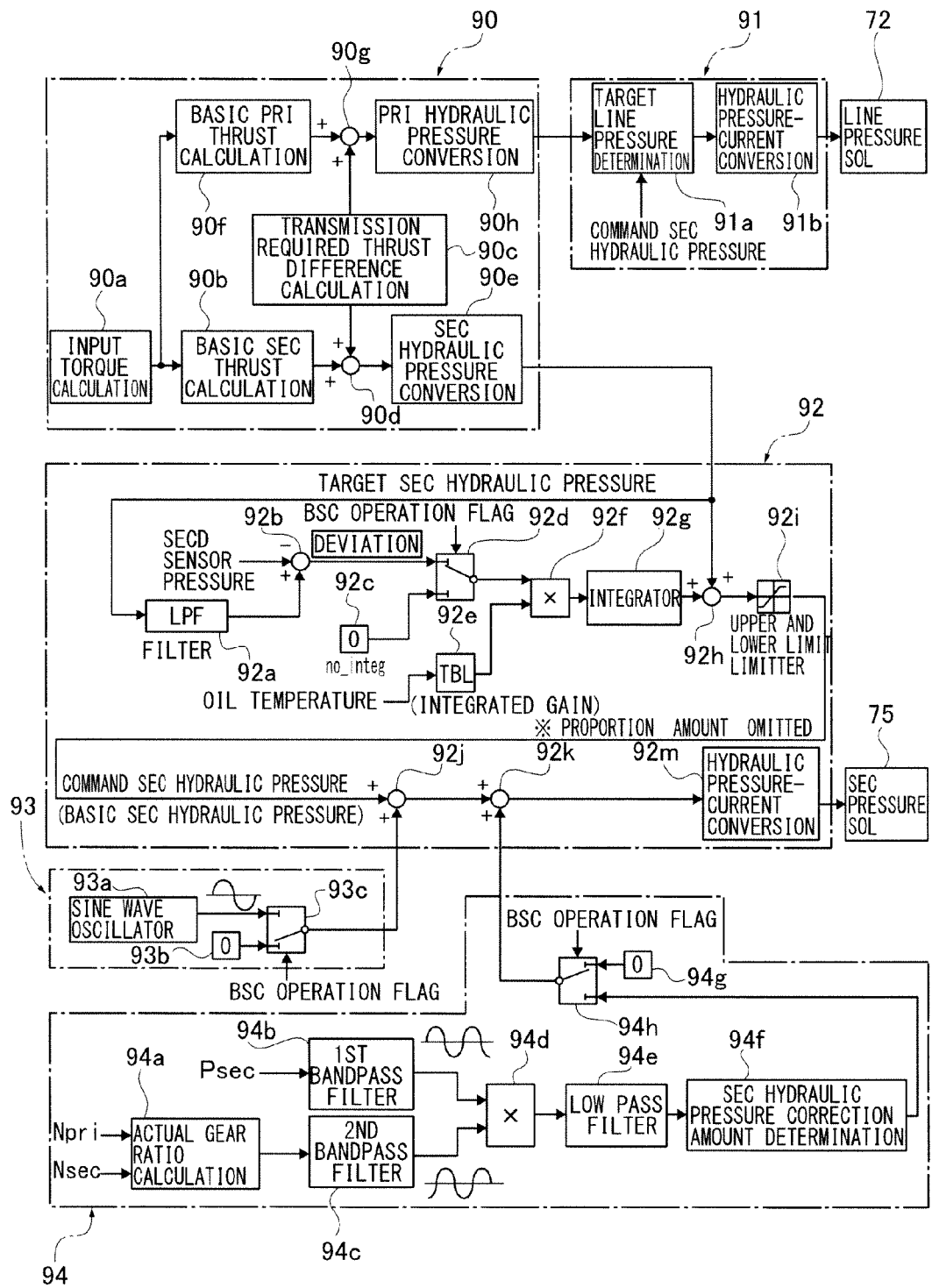
FIG. 4 is a control block diagram showing a line pressure control and secondary hydraulic pressure control (normal control/belt slip control) executed by a CVT control unit 8 according to the embodiment 1.

FIG. 4 is a control block diagram of the line pressure control and secondary hydraulic pressure control (normal control/belt slip control) executed by the CVT control unit 8 according to the embodiment 1.

The hydraulic pressure control system of the CVT control unit 8 in the embodiment 1 comprises a basic hydraulic pressure calculator 90, a line pressure controller 91, a secondary hydraulic pressure controller 92, a sine wave oscillation controller 93, and a secondary hydraulic pressure corrector 94, as shown in FIG. 4.

The basic hydraulic pressure calculator 90 includes an input torque calculator 90a to calculate transmission input torque on the basis of the torque information (engine rotary rate, fuel injection time and the like) from the engine control unit 88 (FIG. 1), a basic secondary thrust calculator 90b to calculate a basic secondary thrust (belt clamp force necessary for the secondary pulley 43) from the transmission input torque obtained by the input torque calculator 90a, a transmission required thrust difference calculator 90c to calculate a thrust difference required for transmission (a difference in belt clamp force between the primary and secondary pulleys 42, 43), a corrector 90d to correct the calculated basic secondary thrust on the basis of the required thrust difference for transmission, and a secondary hydraulic pressure converter 90e to covert the corrected secondary thrust to a target secondary hydraulic pressure. It further includes a basic primary thrust calculator 90f to calculate a basic primary thrust (belt clamp force required for the primary pulley 42) from the transmission input torque calculated by the input torque calculator 90a, a corrector 90g to correct the calculated basic primary thrust on the basis of the required thrust difference for transmission calculated by the transmission required thrust difference calculator 90c, and a primary hydraulic pressure converter 90h to convert the corrected primary thrust to a target primary hydraulic pressure.

The line pressure controller 91 includes a target line pressure determiner 91a to compare the target primary hydraulic pressure output from the primary hydraulic pressure converter 90h with the command secondary hydraulic pressure output from the secondary hydraulic pressure controller 92, and set the target line pressure to the target primary hydraulic pressure when the target primary hydraulic pressure≥the command secondary hydraulic pressure and set the target line pressure to the secondary hydraulic pressure when the target primary hydraulic pressure<the command secondary hydraulic pressure, and a hydraulic pressure-current converter 91b to convert the target line pressure determined by the target line pressure determiner 91a to a current value applied to the solenoid and output a command current value converted to the line pressure solenoid 72 of the regulator valve 71.

In the normal control the secondary hydraulic pressure controller 92 performs the feedback control using the actual secondary hydraulic pressure detected by the secondary hydraulic pressure sensor 82 to acquire a command secondary hydraulic pressure while in the belt slip control the controller performs open control without using the actual secondary hydraulic pressure to acquire the command secondary hydraulic pressure. The secondary hydraulic pressure controller includes a low pass filter 92a through which the target secondary hydraulic pressure from the secondary hydraulic pressure converter 90e is filtered, a deviation calculator 92b to calculate a deviation between the actual secondary hydraulic pressure and the target secondary hydraulic pressure, a zero deviation setter 92c to set the deviation to zero, a deviation switch 92d to selectively switch between the calculated deviation and zero deviation, and an integrated gain determiner 92e to determine an integrated gain from oil temperature. Further, the controller includes a multiplier 92f to multiply the integrated gain from the integrated gain determiner 92e and the deviation from the deviation switch 92d, an integrator 92g to integrate an FB integration control amount from the multiplier 92f, an adder 92h to add the integrated FB integration control amount to the target secondary hydraulic pressure from the secondary hydraulic pressure converter 90e, and a limiter 92i to set upper and lower limits to the added value to obtain the command secondary hydraulic pressure (referred to basic secondary hydraulic pressure in the belt slip control). Further, the controller includes an oscillation adder 92j to add a sine wave oscillation command to the basic secondary hydraulic pressure in the belt slip control, a hydraulic pressure corrector 92k to correct the oscillated basic secondary hydraulic pressure by a secondary hydraulic pressure correction amount to the command secondary hydraulic pressure, and a hydraulic pressure-current converter 92m to convert the command secondary hydraulic pressure into a current value applied to the solenoid to output a command current value converted to the secondary hydraulic pressure solenoid 75. Note that the deviation switch 92d is configured to select the calculated deviation when a BSC operation flag is 0 (during the normal control) and select the zero deviation when the BSC operation flag is 1 (during the belt slip control).

The sine wave oscillation controller 93 includes a sine wave oscillator 93a to decide an oscillation frequency and an oscillation amplitude suitable for the belt slip control and apply sine wave hydraulic pressure oscillation in accordance with the decided frequency and amplitude, a zero oscillation setter 93b to apply no sine wave hydraulic pressure oscillation, and an oscillation switch 93c to selectively switch between the hydraulic pressure oscillation and zero oscillation. Note that the oscillation switch 93c is configured to select the zero oscillation when the BSC operation flag is 0 (during the normal control) and select the sine wave hydraulic pressure oscillation when the BSC operation flag is 1 (during the belt slip control).

The secondary hydraulic pressure corrector 94 includes an actual variable speed ratio calculator 94a to calculate an actual gear ratio Ratio from a ratio of the primary rotary rate Npri of the primary revolution sensor 80 and the secondary rotary rate Nsec of the secondary revolution sensor 81, a first bandpass filter 94b to extract an oscillation component from a signal representing the actual secondary hydraulic pressure Psec obtained with the secondary hydraulic pressure sensor 82, and a second bandpass filter 94c to extract an oscillation component from the calculated data by the actual gear ratio calculator 94a. The corrector further includes a multiplier 94d to multiply the oscillation components extracted by both bandpass filters 94b, 94c, a low pass filter 94e to extract phase difference information from the multiplication result, a secondary hydraulic pressure correction amount determiner 94f to determine a secondary hydraulic pressure correction amount on the basis of the phase difference information from the low pass filter 94e, a zero correction amount setter 94g to set the secondary hydraulic pressure correction amount to zero, and a correction amount switch 94h to selectively switch between the secondary hydraulic pressure correction amount, and the zero correction amount. Note that the correction amount switch 94h is configured to select the zero correction amount when the BSC operation flag is 0 (during the normal control) and select, the secondary hydraulic pressure correction amount when the BSC operation flag is 1 (during the belt slip control).

Figure 5:
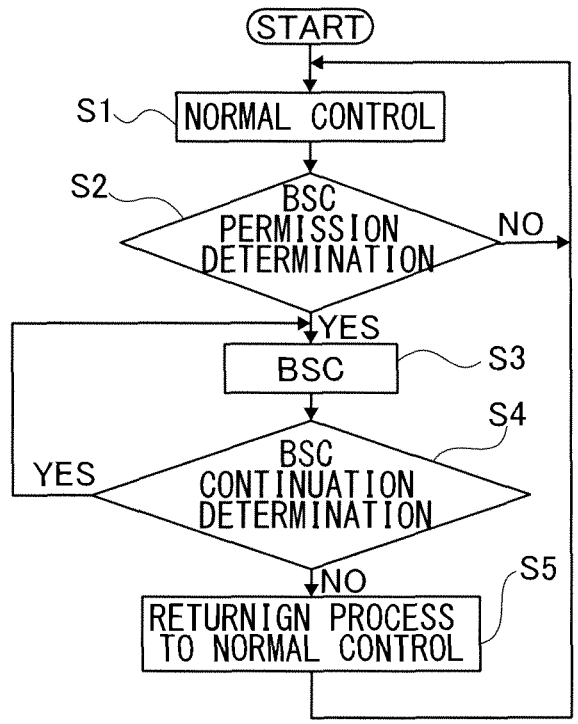
FIG. 5 is a basic flowchart showing a switching process between the normal control and the belt slip control (=BSC) of the secondary hydraulic pressure executed by the CVT control unit 8 according to the embodiment 1.

FIG. 5 is a basic flowchart for a switching process between the normal control and the belt slip control (=BSC) over the secondary hydraulic pressure executed by the CVT control unit 8 according to the embodiment 1. In the following the respective steps in FIG. 5 are described.

In step S1, following a startup by turning-on of the key, the determination on non-BSC permission in step S2 or normal control returning process in step S5, the belt-type continuously variable transmission mechanism 4 is normally controlled, and then the flow proceeds to step S2. During the normal control, the BSC operation flag is set to zero.

In step S2, following the normal control in step S1, a determination is made on whether or not all of the following BSC permission conditions are satisfied. At the result being YES (all the BSC permission conditions satisfied), the flow proceeding to step S3, the belt slip control (BSC) is performed. At the result being NO (any of the BSC permission conditions unsatisfied), the flow returning to step S1, the normal control is continued. An example of the BSC permission conditions is as follows:

(1) The transmitted torque capacity of the belt-type variable transmission mechanism 4 is stable (a change rate of the transmitted torque capacity is small).

This condition (1) is determined by satisfaction of the following two conditions, for example.

a. |(command torque change rate)|<predetermined value
b. |(command gear ratio change rate)|<predetermined value
(2) The estimated accuracy of the input torque to the primary pulley 42 is within a reliable range.

This condition (2) is for example determined on the basis of the torque information (estimated engine torque) from the engine control unit 88, the lockup state of the torque converter 2, the operation state of a brake pedal, a range position and the like.

(3) The permitted conditions in the above (1) (2) are continued for a predetermined length of time.

In step S2 whether or not the above conditions (1), (2), (3) are all satisfied is determined.

In step S3, following the BSC permission determination in step S2 or the BSC continuation determination in step S4, the belt slip control (FIG. 6 to FIG. 8) is performed to reduce an input to the belt 44 of the belt-type variable transmission mechanism 4 and maintain the belt 44 in an appropriate slip state without slippage. Then, the flow proceeds to step S4. During the belt slip control the operation flag is set to 1.

In step S4, following the belt slip control in step S3, a determination is made on whether or not all of the following BSC continuation conditions are satisfied. At the result being YES (all the BSC continuation conditions satisfied), the flow returning to step S3, the belt slip control (BSC) is continued. When the result is NO (any of the BSC continuation conditions unsatisfied), the flow proceeds to step S5, and the normal control returning process is performed. An example of the BSC continuation conditions is as follows:

(1) The transmitted torque capacity of the belt-type continuously variable transmission mechanism 4 is stable (a change rate of the transmitted torque capacity is small).

This condition (1) is determined by satisfaction of the following two conditions, for example.

a. |(command torque change rate)|<predetermined value
b. |(command gear ratio change rate)|<predetermined value
(2) The estimated accuracy of the input torque to the primary pulley 42 is within a reliable range.

This condition (2) is for example determined on the basis of the torque information (estimated engine torque) from the engine control unit 88, the lockup state of the torque converter 2, the operation state of a brake pedal, a range position and the like. Whether or not the above conditions (1), (2) are both satisfied is determined. That is, a difference between the BSC permission conditions and the BSC continuation conditions is in that the BSC continuation conditions exclude the continuation condition (3) of the BSC permission conditions.

In step S5, following a determination that any of the BSC continuation conditions is unsatisfied, the normal control returning process (FIG. 9 to FIG. 11) is performed to prevent the belt 4 from slipping when the belt slip control is returned to the normal control. Upon completion of the process, the flow returns to step S1 and shifts to the normal control.

Figure 6:
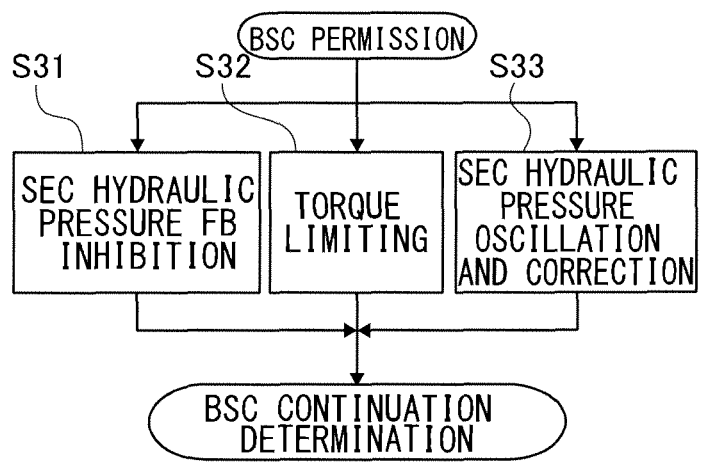
FIG. 6 is a flowchart showing the entire belt slip control process executed by the CVT control unit 8 according to the embodiment 1.
Figure 7:
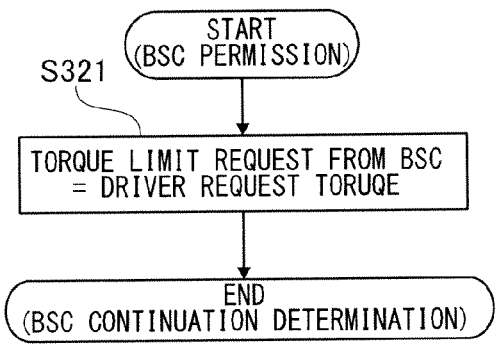
FIG. 7 is a flowchart showing a torque limit process of the belt slip control process executed by the CVT control unit 8 according to the embodiment 1.
Figure 8:
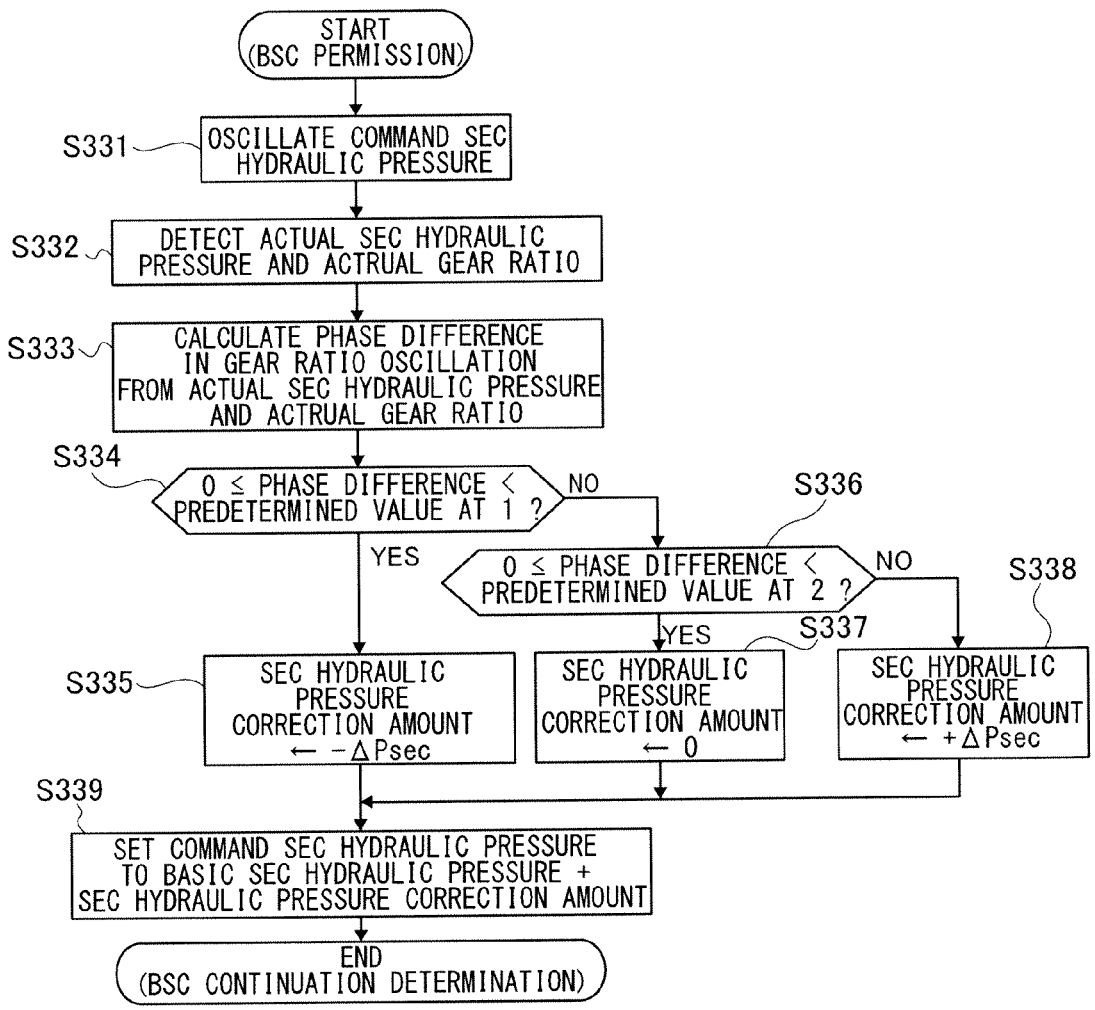
FIG. 8 is a flowchart showing oscillation and a correction process of the secondary hydraulic pressure of the belt slip control process executed by the CVT control unit 8 according to the embodiment 1.

FIG. 6 is a flowchart for the entire belt slip control process executed by the CVT control unit 8 according to the first embodiment. FIG. 7 is a flowchart for the torque limit process of the belt slip control process executed by the CVT control unit 8 according to the first embodiment. FIG. 8 is a flowchart for the secondary hydraulic pressure oscillation and correction process of the belt slip control process executed by the CVT control unit 8 according to the first embodiment.

First, as apparent from FIG. 6, during the belt slip control in which the BSC permission determination and the BSC continuation determination are continued, a feedback control inhibition process (step S31) in which the command secondary hydraulic pressure is obtained using the actual secondary hydraulic pressure, a torque limit process (step S32) as a preparation for returning to the normal control, and a secondary hydraulic pressure oscillation and correction process (step S33) for the belt slip control are concurrently performed.

In step S31, during the belt slip control in which the BSC permission determination and the BSC continuation determination are continued, the feedback control under which the command secondary hydraulic pressure is obtained using the actual secondary hydraulic pressure detected by the secondary hydraulic pressure sensor 82 is inhibited. That is, for obtaining the command secondary hydraulic pressure, the feedback control during the normal control is inhibited and switched to the open control of the belt, slip control using the zero deviation. Then, when the belt slip control is shifted to the normal control, the feedback control returns again.

In step S32, during the belt slip control in which the BSC permission determination and the BSC continuation determination are continued, the torque limit process in FIG. 7 is performed. In step S321 of the flowchart in FIG. 7 a "torque limit request from the belt slip control" is defined to be the driver request torque.

In step S33, during the belt slip control in which the BSC permission determination and the BSC continuation determination are continued, the secondary hydraulic pressure is oscillated and corrected in FIG. 8. In the following the steps of the flowchart in FIG. 8 are described.

In step S331, the command secondary hydraulic pressure is oscillated. That is, the sine wave hydraulic pressure with predetermined amplitude and predetermined frequency is superimposed on the command secondary hydraulic pressure. The flow proceeds to step S332.

In step S332, following the oscillation of the command secondary hydraulic pressure in step S331, the actual secondary hydraulic pressure is detected with the secondary hydraulic pressure sensor 82 to detect the actual gear ratio by calculation based on information on the rotary rates from the primary revolution sensor 80 and the secondary revolution sensor 81. The flow proceeds to step S333.

In step S333, following the detection of the actual secondary hydraulic pressure and the actual gear ratio in step S332, the actual secondary hydraulic pressure and the gear ratio are each subjected to the bandpass filter process to extract their respective oscillation components (sine wave) and multiply them. Then, the multiplied value is subjected to the low pass filter process and converted to a value expressed by amplitude and a phase difference θ (cosine wave) between the oscillation of the actual secondary hydraulic pressure and that of the actual gear ratio. The flow proceeds to step S334. Herein, where A is the amplitude of the actual secondary hydraulic pressure and B is the amplitude of the actual gear ratio, the oscillation of the actual secondary hydraulic pressure is expressed by the formula (1): A sin ωt. The oscillation of the actual gear ratio is expressed by the formula (2): B sin(ωt+θ). The formulas (1) and (2) are multiplied, and using the following product sum formula (3):

$$\sin \alpha \sin \beta = -\tfrac{1}{2}\{\cos(\alpha+\beta)-\cos(\alpha-\beta)\}$$

the following formula (4):

$$A\sin\omega t \times B\sin(\omega t+\theta)=(\tfrac{1}{2})AB\cos\theta-(\tfrac{1}{2})AB\cos(2\omega t+\theta)$$

is obtained.

In the formula (4), (½)AB cos(2ωt+θ) as the double component of the oscillation frequency is reduced through the low pass filter so that the formula (4) becomes the following formula (5):

$$A\sin\omega t \times B\sin(\omega t+\theta)\approx(\tfrac{1}{2})Ab\cos\theta$$

Thus, it can be expressed by the formula of the phase difference θ in the oscillation between the actual secondary hydraulic pressure and the actual gear ratio.

In step S334, following the calculation of the phase difference θ in the oscillation between the actual secondary hydraulic pressure and the actual gear ratio, a determination is made on whether or not the phase difference θ is such that 0≤phase difference θ<predetermined value at 1 (micro slip range). At the result being YES (0≤phase difference θ<predetermined value at 1), the flow proceeds to step S335 while at the result being NO (predetermined value at 1≤phase difference θ), the flow proceeds to step S336.

In step S335, following the determination on 0≤phase difference θ<predetermined value at 1 (micro slip range) in step S334, the secondary hydraulic pressure correction amount is set to −ΔPsec. The flow proceeds to step S339.

In step S336, following the determination on predetermined value at 1≤phase difference θ in step S334, a determination is made on whether or not the phase difference θ is such that predetermined value at 1≤phase difference θ<predetermined value at 2 (target slip range). At the result being YES (predetermined value at 1≤phase difference θ<predetermined value at 2), the flow proceeds to step S337 while at the result being NO (predetermined value at 2≤phase difference θ), the flow proceeds to step S338.

In step S337, following the determination on predetermined value at 1≤phase difference θ<predetermined value at 2 (target slip range) in step S336, the secondary hydraulic pressure correction amount is set to zero and the flow proceeds to step S339.

In step S338, following the determination on predetermined value at 2≤phase difference θ (micro/macro slip transition range) in step S336, the secondary hydraulic pressure correction amount is set to +ΔPsec and the flow proceeds to step S339.

In step S339, following the setting of the secondary hydraulic pressure correction amounts in steps S335, S337, S338, the command secondary hydraulic pressure is set to the value of the basic secondary hydraulic pressure+secondary hydraulic pressure correction amount. Then, the flow is completed.

Figure 9:
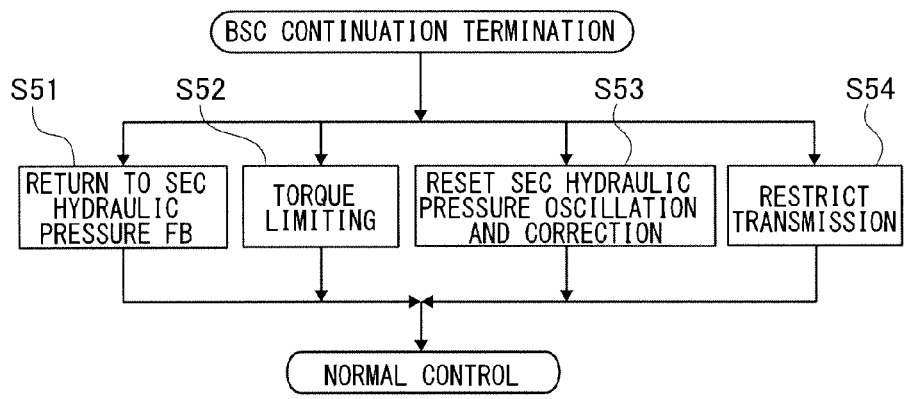
FIG. 9 is a flowchart showing entirely a returning process from the belt slip control to the normal control executed by the CVT control unit 8 according to the embodiment 1.
Figure 10:
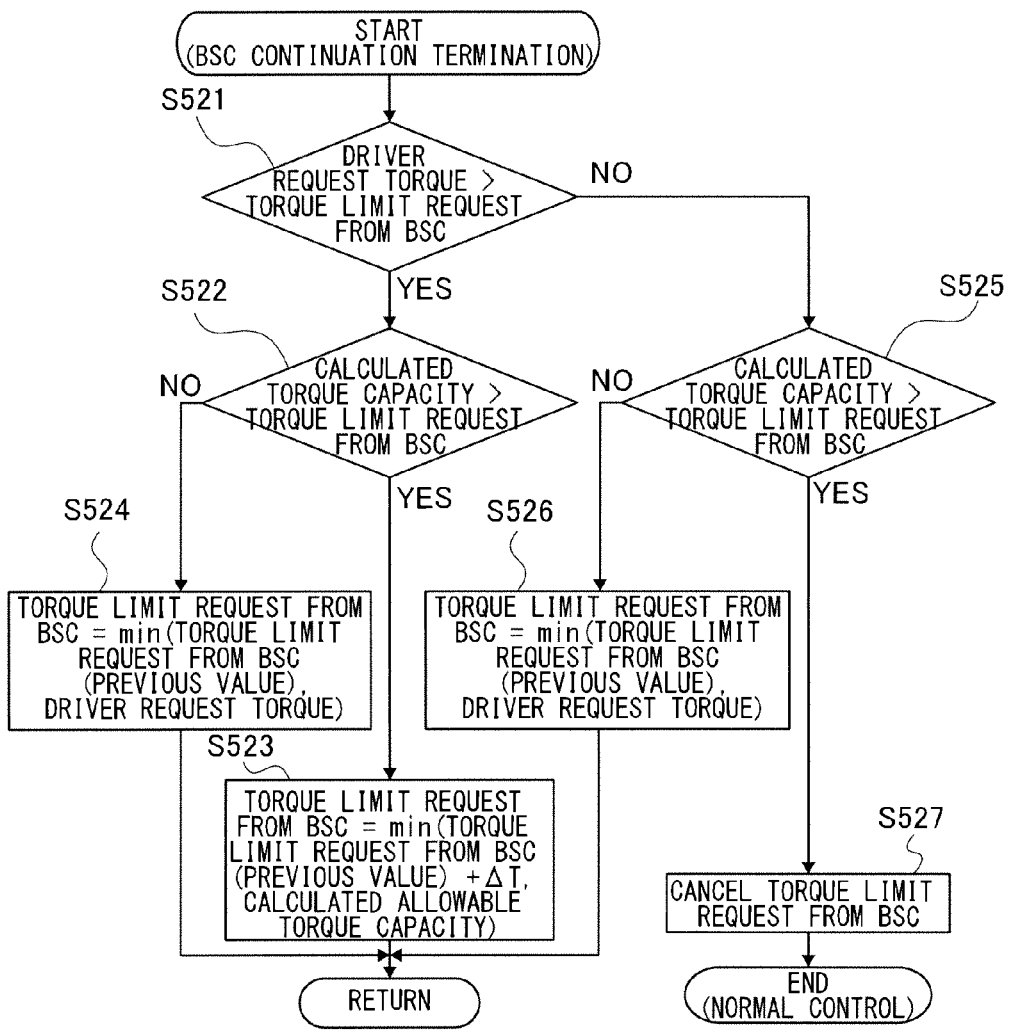
FIG. 10 is a flowchart showing the torque limit process of the return process to the normal control executed by the CVT control unit 8 according to the embodiment 1.
Figure 11:
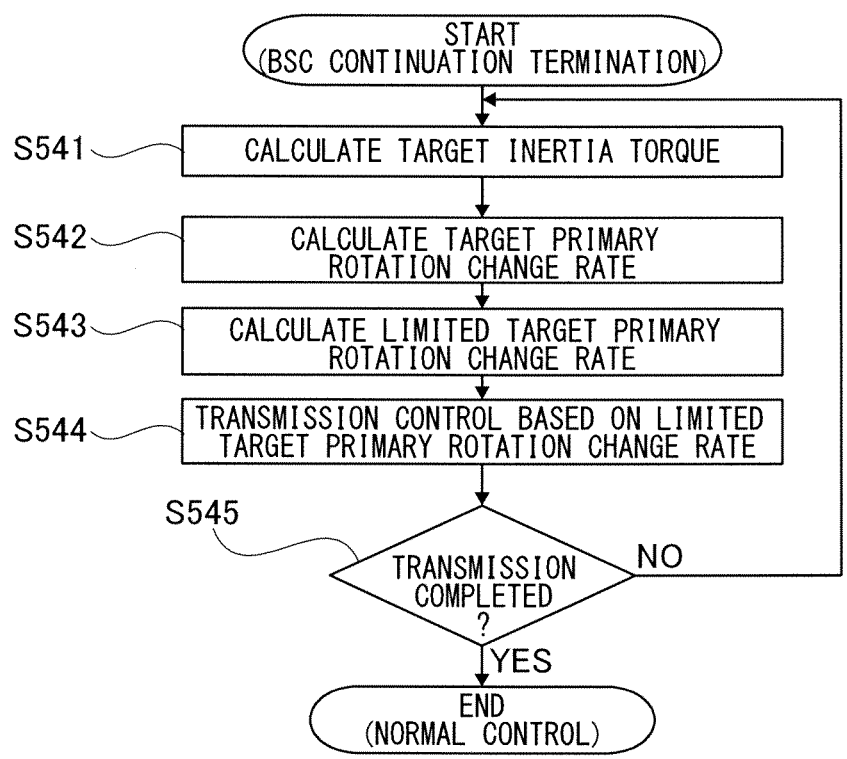
FIG. 11 is a flowchart showing a variable speed limitation process of a variable speed ratio setting a limitation to a target primary revolution, of the return process to the normal control executed by the CVT control unit 8 according to the embodiment 1.

FIG. 9 is a flowchart for a returning process from the belt slip control to the normal control executed by the CVT control unit 8 according to the first embodiment. FIG. 10 is a flowchart for the torque limit process of the returning process to the normal control executed by the CVT control unit 8 according to the first embodiment. FIG. 11 is a flowchart for the transmission restricting process of the returning process to the normal control executed by the CVT control unit 8 according to the first embodiment.

First, as is apparent from FIG. 9, while the normal control is returned from the belt slip control from the BSC continuation termination to the start of the normal control, a feedback control returning process (step S51) in which the command secondary hydraulic pressure is obtained using the actual secondary hydraulic pressure, a torque limit process (step S52) as a preparation for returning to the normal control, an oscillation and correction secondary hydraulic pressure resetting process (step S53) for the belt slip control, and a transmission restricting process (step S54) in which the transmission rate is restricted are concurrently performed.

In step S51, while the normal control is returned from the belt slip control from the BSC continuation termination to the start of the normal control, the feedback control in which command secondary hydraulic pressure is obtained using the actual secondary hydraulic pressure detected by the secondary hydraulic pressure sensor 82 is returned.

In step S52, while the normal control is returned from the belt slip control from the termination of the BSC continuation to the start of the normal control, the torque limit process as a preparation for returning to the normal control in FIG. 10 is performed. Here, "the predetermined period from the start of the returning" may be "from the start of the returning until a predetermined period", "from the start of the returning until the actual secondary hydraulic pressure rises to the belt clamp force at the time of the normal control", or "from the start of returning until the belt clamp force rises to the belt clamp force at the time of the normal control".

In step S53 while the normal control, is returned from the belt slip control from the BSC continuation termination to the start of the normal control, the secondary hydraulic pressure oscillation and correction in FIG. 8 is reset to wait for the normal control.

In step S54 while the normal control is returned from the belt slip control from the BSC continuation termination to the start of the normal control, the transmission restricting process to restrict the transmission speed in FIG. 11 is performed.

In the following the steps of the flowchart showing the torque limit process in FIG. 10 are described. The key point of this torque limit process is to switch the controls on the basis of a magnitude relation among the three values of a driver request torque, torque limit request from the BSC, and a torque capacity (calculated torque capacity). Herein, the driver request torque refers to an engine torque requested by a driver, torque limit request from the BSC refers to torque limit amount shown in the phases (2), (3) in FIG. 13. The torque capacity is generally (phase (1) in FIG. 13) an allowable designed torque capacity and set to a value higher than the driver request torque by a margin with mechanical variation of the belt-type continuously variable transmission mechanism 4 taken into consideration, for the purpose of preventing the belt from slipping. Herein, the actual torque capacity is controlled under the secondary hydraulic pressure control. Further, the calculated torque capacity refers to a torque capacity during the returning process (phase (3) in FIG. 13) of the BSC (phase (2) in FIG. 13). The calculated torque capacity is specifically a value based on or calculated from the actual secondary hydraulic pressure and the actual gear ratio (torque capacity of one of the two pulleys 42, 43 to which engine torque is input, that is, the primary pulley 42).

In step S521 a determination is made on whether or not the driver request torque is larger than the torque limit request from the BSC. When the result is YES, the flow proceeds to step S522, when the result is NO, the flow proceeds to step S525.

In step S522 following the determination on the driver request torque is larger than the torque limit request from the BSC in step S521, a determination is made on whether or not the calculated torque capacity is larger than the torque limit request from the BSC. When the result is YES, the flow proceeds to step S523, when the result is NO, the flow proceeds to step S524.

In step S523 following the determination on the calculated torque capacity>the torque limit request from the BSC in step S522, the torque limit request from the BSC is set to a smaller one of the torque limit request, from the BSC (previous value)+ΔT and the calculated allowable torque capacity. The flow proceeds to RETURN.

In step S524 following the determination on the calculated torque capacity≤the torque limit request from the BSC in step S522, the torque limit request from the BSC is set to a smaller one of the torque limit request from the BSC (previous value) and the driver request torque. The flow proceeds to RETURN.

In step S525 following the determination on the driver request torque≤the torque limit request from the BSC in step S521, a determination is made on whether or not the calculated torque capacity is larger than the torque limit request from the BSC. At the result being YES, the flow proceeds to step S527 while at the result being NO, the flow proceeds to step S526.

In step S526, following the determination on the calculated torque capacity≤the torque limit request from the BSC in step S525, the torque limit request from the BSC is set to a smaller one of the torque limit request from the BSC (previous value) and the driver request torque. The flow proceeds to RETURN.

In step S527 following the determination on the calculated torque capacity>the torque limit request from the BSC in step S525, the torque limit request from the BSC is cancelled. The flow is completed.

Next, the steps of the flowchart showing the transmission restricting process by limiting the target primary rotary rate in FIG. 11 are described.

In step S541, a target inertia torque is calculated. The flow proceeds to step S542.

In step S542, following the calculation of the target inertia torque in step S541, a target primary revolution change rate is calculated from the target inertia torque. Then, the flow proceeds to step S543.

In step S543, following the calculation of the target primary revolution change rate in step S542, a limited target primary rotary rate not exceeding the target primary revolution change rate is calculated, and the flow proceeds to step S544.

In step S544 following the calculation of the limited target primary revolution change rate in step S543, the transmission control is performed on the basis of the limited target primary rotary rate, and the flow proceeds to step S545.

In step S545, following the transmission control in step S544, a determination is made on whether or not the transmission control based on the limited target primary rotary rate is completed or the actual primary rotary rate has reached the limited target primary rotary rate. At the result being YES (completion of transmission control), the flow ends while at the result being NO (in the middle of transmission control), and the flow returns to step S541.

Next, the operation of the control device and the control method for the belt-type continuously variable transmission mechanism 4 according to the first embodiment is described. The control device and the control method are divided into four parts, BSC permission and continuation determining operations, BSC permission and continuation determining operations based on |(command transmission change rate)|<predetermined value, belt slip control operation (BSC operation), and return control operation from the BSC to the normal control.

[BSC Permission and Continuation Determining Operations]

At a start of the vehicle's running, the operation proceeds to step S2 from step S1 in the flowchart in FIG. 5. Unless all the BSC permission determining conditions are satisfied in step S2, the flow from step S1 to step S2 are repeated to continue the normal control. That is, the satisfaction of all the BSC permission determining conditions in step S2 is defined to be BSC control starting condition.

The BSC permission conditions in the first embodiment are as follows:
(1) The transmitted torque capacity of the belt-type continuously variable transmission mechanism 4 is stable (a change rate of the transmitted torque capacity is small). This condition (1) is determined by satisfaction of the following two conditions, for example.
a. |(command torque change rate)|<predetermined value
b. |(command gear ratio change rate)|<predetermined value
(2) The estimated accuracy of the input torque to the primary pulley 42 is within a reliable range.

This condition (2) is for example determined on the basis of the torque information (estimated engine torque) from the engine control unit 88, the lockup state of the torque converter 2, the operation state of a brake pedal, a range position and the like.
(3) The permitted conditions in the above (1) (2) are continued for a predetermined length of time.
In step S2 whether or not the above conditions (1), (2), (3) are all satisfied is determined.

Thus, the belt slip control is allowed to start if the transmission torque capacity of the belt-type variable transmission mechanism 4 continues to be stable and the estimated accuracy of the input torque to the primary pulley 42 is continuously within a reliable range for a predetermined length of time during the normal control.

In this way, the belt slip control is permitted to start upon the satisfaction of all the BSC permission conditions so that it is able to start the belt slip control in a preferable range with an assured high control precision.

After the BSC permission is determined in step S2, in step S3 the belt slip control is performed to reduce an input to the belt 44 of the belt-type continuously variable transmission mechanism 4 and maintain the belt 44 in an appropriate slip state without slippage. Then, in step S4 following the belt slip control in step S3, a determination is made on whether or not all of the BSC continuation conditions are satisfied. As long as all of the BSC continuation conditions are satisfied, the flow from step S3 to step S4 is repeated to continue the belt slip control (BSC).

Here, the BSC continuation conditions in the embodiment 1 are the BSC permission conditions (1), (2) and exclude the continuation condition for a predetermined length of time (3) of the BSC permission conditions. Because of this, it is made possible to prevent continuation of the belt slip control with unsecured control precision since the belt slip control is immediately stopped and returned to the normal control if one of the conditions (1), (2) is unsatisfied during the belt slip control.

[Belt Slip Control Operation (BSC Operation)]

At the initiation of the belt, slip control, the secondary hydraulic pressure is set to a value to acquire the clamp force not to cause belt slippage with estimated safety so that the condition that the phase difference θ is lower than the predetermined value 1 is satisfied. In the flowchart in FIG. 8 the flow from step S331→step S332→step S333→step S334→step S335 to step S339 is repeated and every time the flow is repeated, the command secondary hydraulic pressure is decreased in response to the correction by −Δpsec. Then, until the phase difference θ at 1 or more reaches the predetermined value at 2, the flow proceeds from step S331→step S332→step S333→step S334→step S336→step S337 to step S339 in FIG. 8 to maintain the command secondary hydraulic pressure. When the phase difference θ is the predetermined value at 2 or more, the flow proceeds from step S331→step S332→step S333→step S334→step S336→step S338 to step S339 to increase the command secondary hydraulic pressure in response to the correction by +Δpsec. Under the belt slip control the slip rate is maintained so that the phase difference θ falls within the range of the predetermined values from 1 or more to less than 2.

The belt slip control is described with reference to the timing chart in FIG. 12. At time t1, the above BSC permission conditions (1), (2) are satisfied and continued (BSC permission condition (3)). From time t2 to time t3, at least one of the above BSC continuation conditions (1), (2) becomes unsatisfied, and the BSC operation flag and SEC pressure F/B inhibiting flag (secondary pressure feedback inhibiting flag) are set for the belt slip control. A little before time t3 the accelerator is pressed, so that at least one of the BSC continuation conditions becomes unsatisfied and the control to return to the normal control is performed from time t3 to time t4. After time t4, the normal control is performed.

Figure 12:
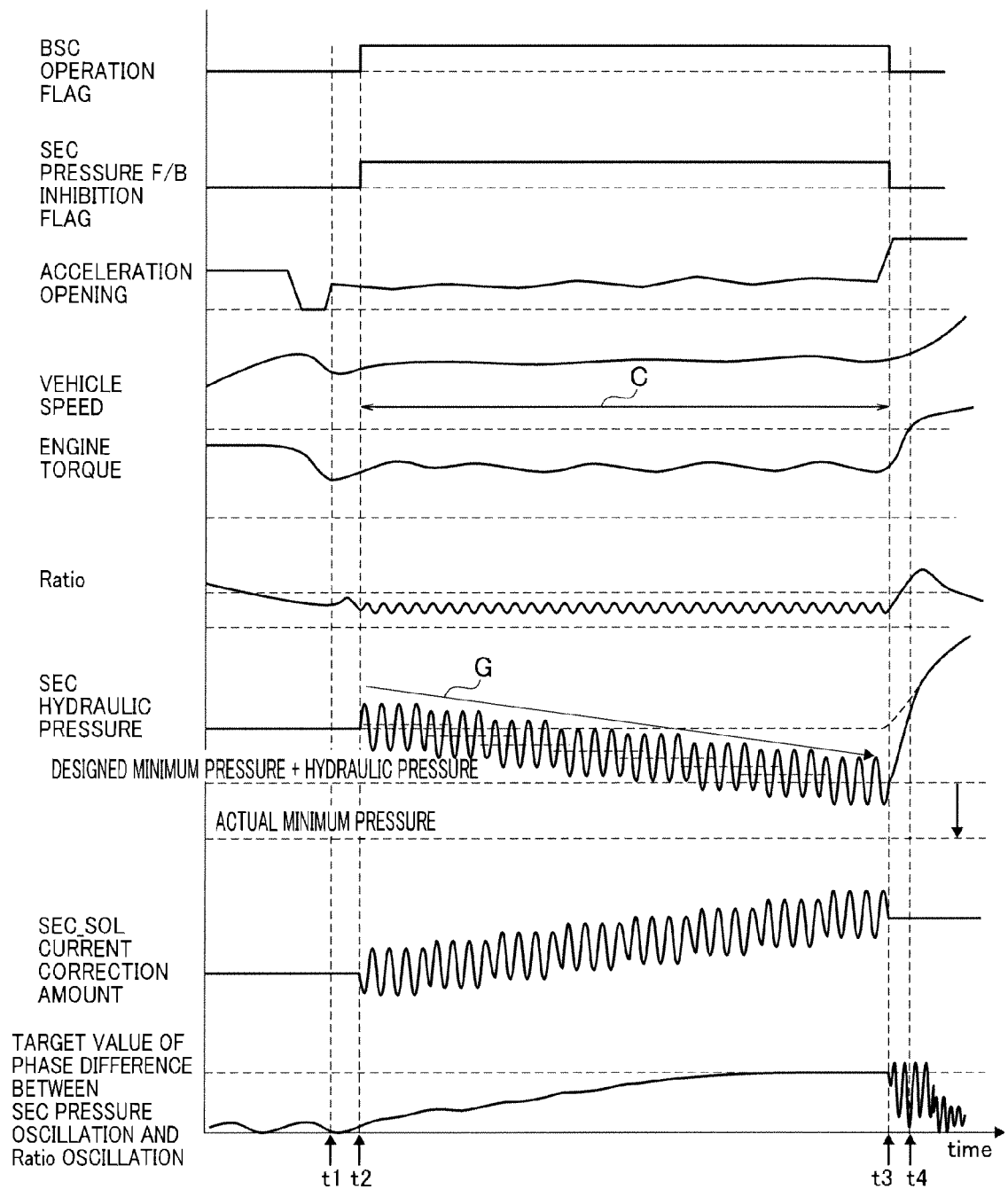
FIG. 12 is a timing chart showing a characteristic of a phase difference between a ratio oscillation and each of a BSC operation flag, an SEC pressure F/B inhibition flag, an accelerator opening degree, a vehicle speed, an engine torque, a Ratio, an SEC hydraulic pressure, a current correction amount of SEC_SOL, and an SEC pressure oscillation in a driving scene returning from the normal control through the belt slip control and the return control to the normal control.

Thus, as is apparent from the accelerator opening characteristic, vehicle speed characteristic, and engine torque characteristic as well as the solenoid current correction amount characteristic of the secondary hydraulic pressure solenoid 75 during steady running determination indicated by the arrow C in FIG. 12, under the belt slip control, the phase difference θ between the oscillation components of the secondary hydraulic pressure due to the oscillation and the variable speed ratio is monitored to increase or decrease the current value. Note that the secondary hydraulic pressure solenoid 75 is normally open (always open) and decreases the secondary hydraulic pressure along with a rise of the current value.

The actual gear ratio is maintained to be virtually constant by the belt slip control although it fluctuates with small amplitude as shown in the actual transmission characteristic (Ratio) in FIG. 12. The phase difference θ, as shown in the phase difference characteristics of the SEC pressure oscillation and Ratio oscillation in FIG. 12, gradually increases with time from time t2 when the slip rate is approximately zero, and reaches a target value (target slip rate). The secondary hydraulic pressure as shown in the SEC hydraulic pressure characteristic in FIG. 12 decreases with time from time t2 when safety is secured, as indicated by the arrow G, and reaches a value of the designed minimum pressure added with hydraulic pressure amplitude in the end which is in the hydraulic pressure level with a margin to the actual minimal pressure. While the belt slip control continues for a long time, the actual secondary hydraulic pressure is maintained in the amplitude range of the designed minimum pressure plus hydraulic pressure to maintain the target value of the phase difference θ (of slip rate).

In this way, the belt friction operating on the belt 44 is reduced by reducing the secondary hydraulic pressure by the belt slip control, by the reduction of the belt friction, a drive load to drive the belt-type continuously variable transmission mechanism 4 is kept down. Consequently, it is possible to accomplish the improvement in practical fuel consumption without affecting travelling performance, during the belt slip control by the BSC permission determination.

[Torque Limit Operation in Return Control from BSC to Normal Control]

During the belt slip control while the BSC permission and continuation determinations are continued, the torque limit process in step S32 in FIG. 6 is performed by setting the torque limit request from the belt slip control as the driver request toque in step S321 in FIG. 7. In the following torque limit operation for retuning to the normal control is described with reference to FIG. 10 and FIG. 13.

The engine control unit 88 has first a torque limit amount as an upper control limit engine torque, and limits the actual torque of the engine 1 not to exceed the torque limit amount. The torque limit amount is determined according to various requests. For example, the upper limit input torque to the belt-type variable transmission mechanism 4 is set to the torque limit request during the normal control (phase (1) in FIG. 13), and the CVT control unit 8 sends the torque limit request during the normal control to the engine control unit 88. The engine control unit 88 selects the minimum one of torque limit requests from various controllers as the limit torque amount.

Figure 13:
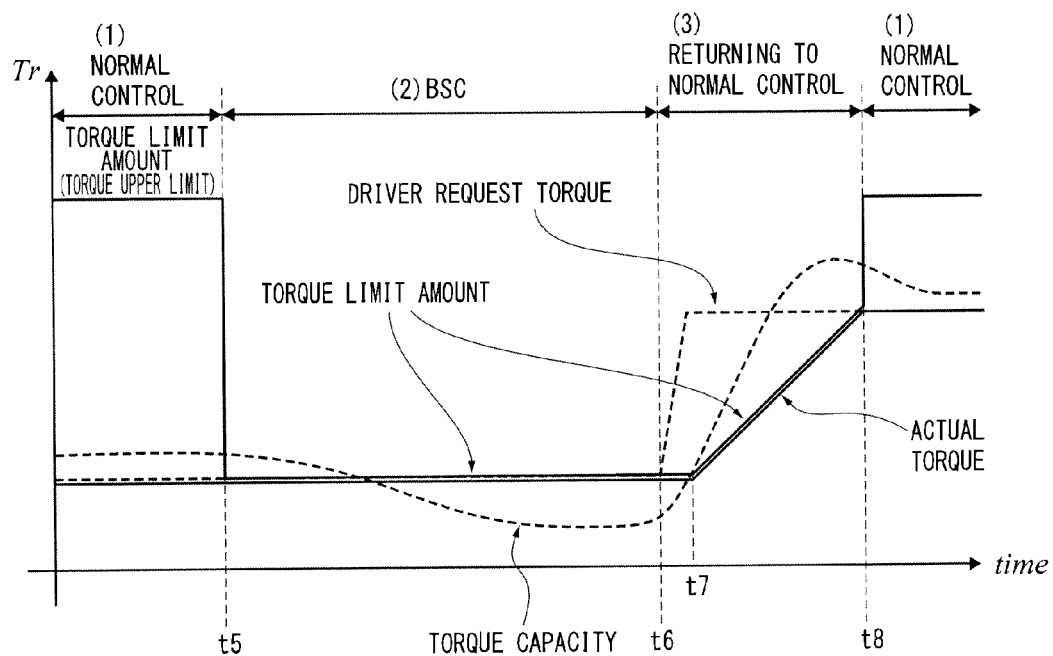
FIG. 13 is a timing chart showing a characteristic of each of a driver request torque, a limited amount of torque, a torque capacity, and an actual torque, explaining a torque limit operation according to a torque delay adopted in the return control from the belt slip control to the normal control in the embodiment 1.

Specifically, at time t5 the phase (1) of the normal control is shifted into the belt slip control; and the torque limit request from the BSC is sent to the engine control unit 88 in the phase (2) as shown in the limit torque amount characteristic in FIG. 13. However, the torque limit request from the BSC during the BSC (phase (2) in FIG. 13) is for preparation in advance for the torque limiting in FIG. 10 and does not virtually function as a torque limit during the BSC (phase (2) in FIG. 13).

Then, at time t6 the BSC continuation is aborted and the flow is shifted into the control to return to the normal control. At time t6 a torque limit request is issued because of the driver request torque>torque limit request from the BSC and the calculated torque capacity≤torque limit request from the BSC. Therefore, the flow from step S521→step S522→step S524 to RETURN in the flowchart in FIG. 10 is repeated to maintain the torque limit request from the BSC (previous value) in step S524.

Thereafter, at time t7 the driver request torque>torque limit request from the BSC and the calculated torque capacity>torque limit request from the BSC. The flow from step S521→step S522→step S523 to RETURN in FIG. 10 is repeated to gradually increase the torque limit request from the BSC to be (previous value+ΔT). Along with this rising gradient, the actual torque gradually rises.

Due to the rise of the torque limit request from the BSC since time t7, at time t8 the driver request torque≤torque limit request from the BSC and the calculated torque capacity>torque limit request from the BSC. The flow proceeds from step S521→step S525→step S527 to END in the flowchart in FIG. 10. In step S527 the torque limit from the BSC is cancelled.

In this example the flow skips step S526 which is executed when the accelerator is manipulated as stepped on or returned (released) for a short period of time. Specifically, step S526 is skipped when the belt slip control is cancelled by stepping-on of the accelerator and the accelerator is released as soon as the return control starts.

That is to say, in the belt slip control, because a control slipping positively the belt in an allowable slip range is performed, the belt clamp force is in a state that is lower than that in the normal control. When returning from the belt slip control to the normal control, if the input torque to the belt-type continuously variable transmission mechanism 4 changes in an increasing direction, there is possibility that the input torque exceeds the belt clamp force and an excessive belt slip occurs.

To deal with this, by limiting a changing rate of the input torque changing in the increasing direction and restricting the increment in the input torque so as to maintain the actual torque at the time of the belt slip control completion during a period from the time t6 to the time t7 in FIG. 13 in a transition period returning from the belt slip control to the normal control, it can be inhibited that the input torque to the belt-type continuously variable transmission mechanism 4 is excessively larger than the belt clamp force while the belt clamp force at the completion time of the belt slip control is returned to a level at the time of the normal control.

Consequently, when returning from the belt slip control to the normal control, because the torque limit control for restricting the ratio of change of the input torque to the belt-type continuously variable transmission mechanism 4 is performed, it is inhibited that the belt-type continuously variable transmission mechanism 4 is excessively larger than the belt clamp force, thereby it is possible to prevent the belt 44 from being slipped.

In particular, in the embodiment 1, because the torque limit control to maintain the input torque at the time of belt slip control completion to the belt-type continuously variable transmission mechanism 4 is performed, it can be inhibited securely that the input torque to the belt-type continuously variable transmission mechanism 4 is excessively larger than the belt clamp force, regardless of a simple torque limit control.

[Operation of Primary Revolution Raising Rate Limit in the Return Control from the BSC to the Normal Control]

At the time of the return control from the belt slip control to the normal control, when performing the torque limit control and changing a variable speed ratio by a normal transmission rate in a state where a rapidity of change of the input torque to the belt-type continuously variable transmission mechanism 4 is restricted, because the input torque based on the change of a revolution inertia is significantly reduced, a necessary deceleration feeling (pull shock) to a driver is subjected to a driver. Therefore, it is performed to limit a rapidity of change of the variable speed ratio with the limitation of the rapidity of change of the input torque to the belt-type continuously variable transmission mechanism 4.

Figure 14:
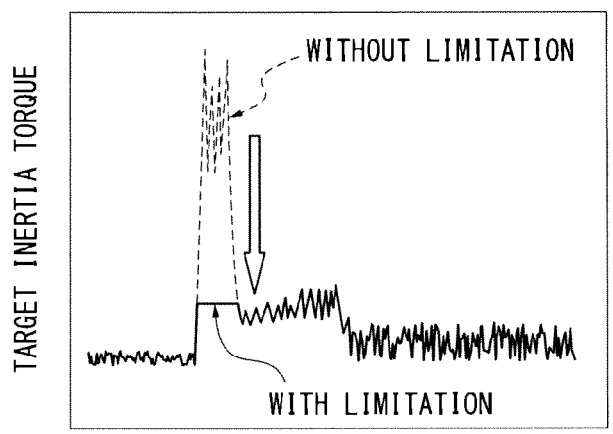
FIG. 14 is a comparative characteristic view showing a target inertia torque without limitation and a target inertia torque with limitation, in the variable speed limitation process for the variable speed ratio setting the limitation to the target primary revolution adopted in the embodiment 1.
Figure 15:
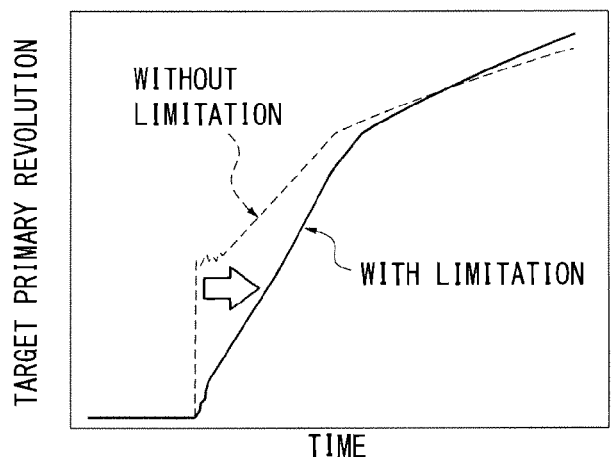
FIG. 15 is a comparative characteristic view showing a target primary revolution without limitation and a target primary revolution with limitation, in the variable speed limitation process of the variable speed ratio setting the limitation to the target primary revolution adopted in the embodiment 1.
Figure 16:
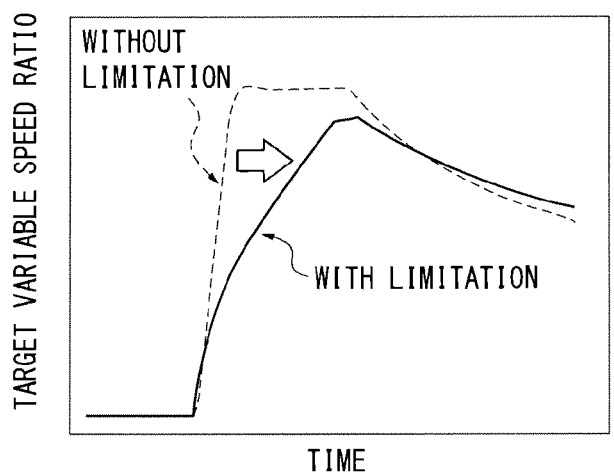
FIG. 16 is a comparative characteristic view showing a target variable speed ratio without limitation and a target variable speed ratio with limitation which are finally produced in the variable speed limitation process for the variable speed ratio setting the limitation to the target primary revolution adopted in the embodiment 1.

That is to say, the BSC continuation is paused, and when the flow is shift to the return control to return to the normal control, the flow from step S541→step S542→step S543→step S544 to step S545 in the flowchart in FIG. 11 is repeated until the completion of the transmission. In other words, in step S541, as shown in a characteristic without limitation in FIG. 14, the target inertia torque is calculated by the engine torque. In the next step S542, as shown in a characteristic without limitation in FIG. 15, a change rate of the target primary revolution is calculated by the target inertia torque. Thus, as shown by arrow in FIG. 14, the inertial torque to be reduced is set, and a restricted target primary revolution not to exceed a change rate (gradient) of the target primary revolution without limitation is calculated based on the target inertia torque with limitation, in step S543, as shown in a characteristic with limitation in FIG. 15. In addition, in step S544, the transmission control is performed based on the restricted target primary revolution. In this way, by achieving the transmission control based on the restricted target primary revolution, with respect to the finally produced target variable speed ratio, when comparing a characteristic of the target variable speed ratio with limitation with a characteristic of the target variable speed ratio without limitation, as shown in FIG. 16, the change of the target variable speed ratio in the characteristic of the target variable speed ratio with limitation has a gentle gradient.

Figure 17:
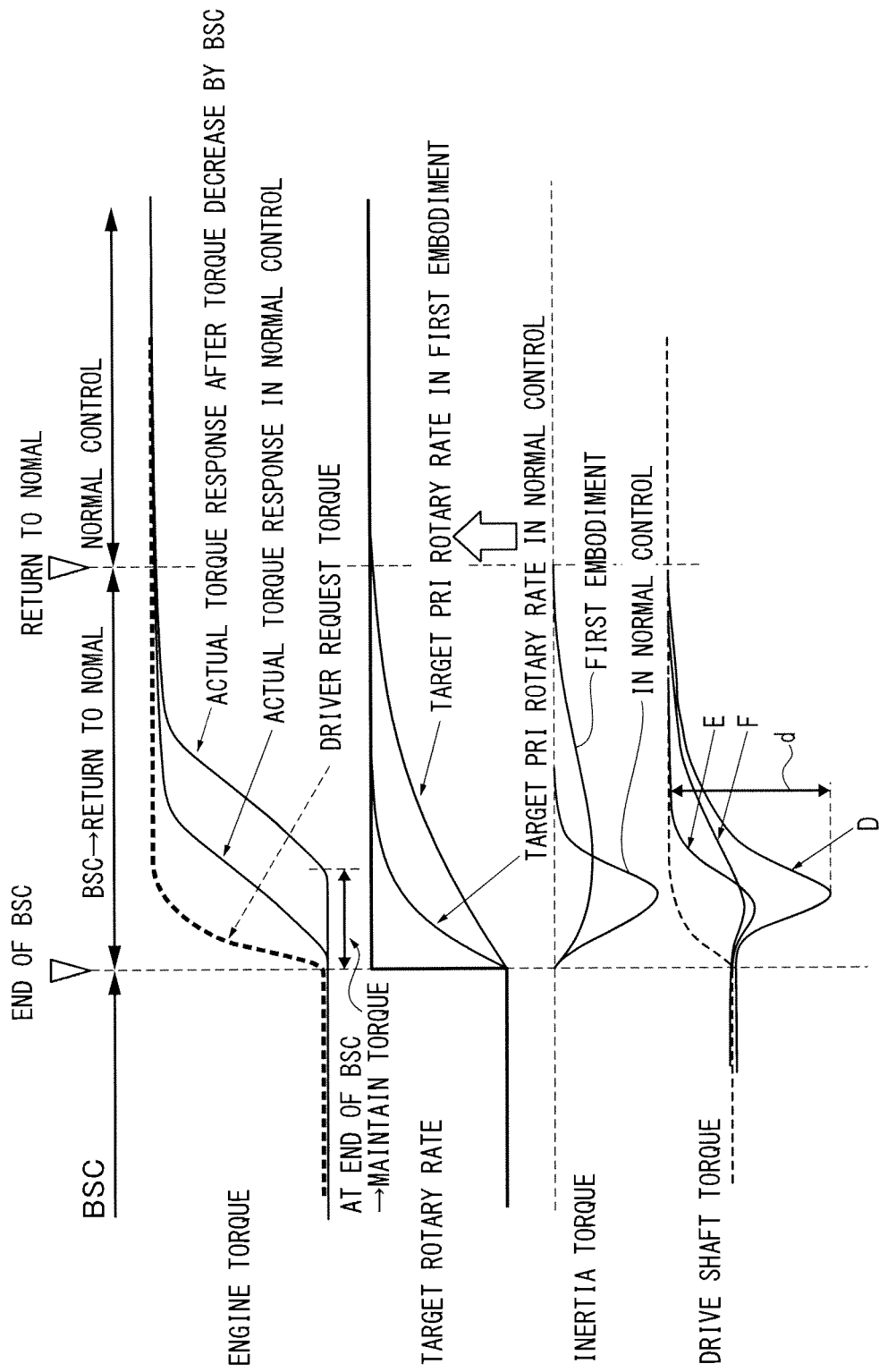
FIG. 17 is a time chart showing a characteristic of each of an engine torque, a target primary revolution, an inertia torque, and a drive shaft torque by a torque delay and a primary revolution rising rate limiter adopted in the return control in the embodiment 1.

A return control operation by the torque delay and the primary revolution-increasing rate limiter adopted in the embodiment 1 is described with reference to a time chart as shown in FIG. 17.

An engine torque characteristic is first explained. In the engine torque characteristic in an area from the BSC completion to the normal returning, a driver request torque shows a stepwise rising characteristic, and the engine torque characteristic depending on an actual torque response on the normal time in which a torque limit control is not performed shows a characteristic in which a torque rises immediately after the BSC completion. On the contrary, the engine characteristic in the embodiment 1 shows that the torque is maintained for a while after the BSC completion, thereafter the torque rises belatedly, as shown in the actual torque response after the torque down by the BSC.

Next, a target variable speed ratio characteristic and an inertia torque characteristic are explained. A target primary revolution characteristic in an area from the BSC completion to the normal returning shows that an attainment target characteristic is given by a step characteristic at the time of the BSC completion, and a target primary revolution characteristic on the normal time where a limit control for a primary revolution-rising rate is not performed shows that a target primary revolution rises with a large gradient immediately after the BSC completion. On the contrary, the target primary revolution characteristic in the embodiment 1 shows that the target primary revolution gradually rises with a gentle gradient more than that of the normal time. In addition, the inertia torque characteristic on the normal time is sharply reduced from the BSC completion whereas the inertia torque characteristic in the embodiment 1 is gently reduced for a period from the time of the BSC completion to the time of the normal returning.

Finally, a drive shaft torque characteristic and an inertia torque characteristic are explained. The drive shaft torque characteristic when the torque delay and the primary revolution-rising rate-limit control are not performed together (normal time) shows that a torque reduces somewhat more than that in after transmission initiation and before the transmission initiation, thereafter the torque increases because the inertia torque has a large peak, but the engine torque has a rapid response, as shown by an E characteristic in FIG. 17. If the drive shaft characteristic is obtained, a shock due to the transmission does not occur.

A drive shaft characteristic in which the torque delay is performed, but the primary revolution rising rate-limit control is not performed has a characteristic having a drop that, by generating an engine torque input delay due to the torque delay while maintaining the inertia characteristic which is the same as the normal time, the torque is significantly reduced more than that in after the transmission initiation and before the transmission initiation, and thereafter the torque increases, as shown in a D characteristic in FIG. 17. When the change of the drive shaft torque occurs, a driver feels a shock to lead degeneration of driving performance and comfort.

On the contrary, the drive shaft torque characteristic in the embodiment 1 in which the torque delay and the primary revolution rising rate-limit control are together performed has a characteristic that, if the engine torque input is belated for the torque delay, because the peak of the inertia torque can be reduced by the primary revolution rising rate-limit control, the torque is somewhat reduced more than that in after the transmission initiation and before the transmission initiation, and thereafter the torque increases, as shown in an F characteristic in FIG. 17. That is to say, when the torque delay and the primary revolution rising rate-limit control are performed simultaneously, it is determined that a shock is restricted.

As mentioned above, at the time of the return control from belt slip control to the normal control, with the performance of the torque limit control, by achieving a control to provide a limitation to a change rate of the primary revolution, a change of the revolution inertia at the time of the transmission initiation is reduced, the fact that the drive shaft torque is decrease more than that in before transmission initiation can be restricted, consequently, it is possible to prevent unnecessary shock (deceleration feeling) from giving to a driver.

Next, advantageous effects are explained.

The control device and the control method for the belt-type continuously variable transmission mechanism 4 according to the embodiment 1 make it possible to obtain advantageous effects listed below.

(1) In the control device for the belt-type continuously variable transmission 4, including the primary pulley 42 for receiving an input from a drive source (engine 1), the secondary pulley 43 for providing an output to the drive wheels 6, 6, and the belt 44 wound around the primary pulley 42 and the secondary pulley 43, to control a variable speed ratio determined by a running radius ratio of the belt 44 on the pulleys by controlling a primary hydraulic pressure to the primary pulley 42 and a secondary hydraulic pressure to the secondary pulley 43, the control device further includes a belt slip control means (step S3) to perform a belt slip control holding a predetermined belt slip condition by reducing an actual secondary hydraulic pressure to be lower than that in the time of a normal control; and a normal control-return control means (step S5) to limit an input torque-change rate in which an input torque to the belt-type continuously variable transmission changes in an increasing direction until the hydraulic pressure rises to a hydraulic pressure in which the input torque to the belt-type continuously variable transmission is not excessive relative to a belt clamp force, when returning from the belt slip control to the normal control by an increment in the input torque to the belt-type continuously variable transmission, the limitation being performed for a predetermined period from an initiation of the return.

Consequently, when returning from the belt slip control to the normal control, by restricting that the input torque-change rate in which the input torque to the belt-type continuously variable transmission 4 is excessive relative to the belt clamp force, it is possible to provide a control device for the belt-type continuously variable transmission 4 which prevents the belt slip from occurring.

(2) In the normal control-return control means (step S5), the predetermined period to perform the limitation to the input torque changing rate is set to be a period from the returning initiation to a predetermined time. Therefore, it is possible to restrict easily the predetermined period to perform the limitation to the input torque changing rate a time management such as a timer or the like.

(3) In the normal control-return control means (step S5), the predetermined period to perform the limitation to the input torque-change rate is set to be a period from the return initiation until the actual secondary hydraulic pressure raises to a hydraulic pressure during the normal control. Therefore, it is possible to set the predetermined period which performs the limitation to the input torque-change rate to an appropriate variable period in which the actual secondary hydraulic pressure of the belt-type continuously variable transmission 4 is returned to a hydraulic pressure during the normal control, and which is until the securement of the belt clamp force is estimated, regardless of input of change in environment, disturbance or the like.

(4) In the normal control-return control means (step S5), the predetermined period to perform the limitation to the input torque-change rate is set to be period from the return initiation until the belt clamp force rises to the belt clamp force during the normal control. Therefore, it is possible to set the predetermined period to perform the limitation to the input torque-change rate to an appropriate variable period in which a pulley thrust of the belt-type continuously variable transmission 4 is returned to a thrust during the normal control and the belt clamp force is secured, regardless of input of change in environment, disturbance or the like.

(5) In the normal control-return control means, when returning from the belt slip control to the normal control, the predetermined period to perform the limitation to the input torque-change rate holds as-is the input torque to the belt-type continuously variable transmission as an input torque at the time of the belt slip control completion (FIG. 10). Therefore, regardless of a simple torque limit control, it can securely be inhibited that the input torque to the belt-type continuously variable transmission 4 is excessive relative to the belt clamp force.

(6) The normal control-return control means (step S5) limits the change rate of the variable speed ratio with the limitation to the input torque-change rate to perform in returning from the belt slip control to the normal control. Therefore, it can be inhibited that the drive shaft torque is lower than that in before the transmission initiation by reducing the revolution inertia change at the time of the transmission initiation. Consequently, it is possible to prevent unnecessary shock from giving to a driver.

(7) The normal control-return control means (step S5) restricts the change rate of the variable speed ratio by giving a limitation to the change ratio of the revolution of the primary pulley, changing toward a target variable speed ratio (FIG. 11). Therefore, when restricting the transmission rate of the variable speed ratio, because the reduction of the inertia torque can be controlled, it is possible to prevent effectively a shock (deceleration feeling) from occurring.

(8) In a control method for a belt-type continuously variable transmission 4 by a belt slip control in which a belt slip condition among the primary pulley 42, the secondary pulley 43, and the belt 44 is controlled by a hydraulic pressure, the belt slip control includes oscillating the hydraulic pressure and controlling the hydraulic pressure by the belt slip control to estimate the belt slip condition by monitoring a phase difference calculated on the basis of a multiplication value of an oscillation component included in an actual hydraulic pressure and an oscillation component included in an actual variable speed ratio and to maintain a predetermined belt slip condition by reducing the hydraulic pressure to be lower than that in the time of the normal control based on the estimation; and limiting by the belt slip control an input torque-change rate in which the input torque to the belt-type continuously variable transmission changes in an increasing direction until the hydraulic pressure rises to a hydraulic pressure in which the input torque to the belt-type continuously variable transmission is not excessive relative to a belt clamp force, the limitation being performed for a predetermined period from an initiation of return to a normal control, when returning to the normal control by an increment in the input torque to the belt-type continuously variable transmission.

(9) In the belt slip control, the belt slip condition is estimated by monitoring a phase difference calculated from the multiplication value, to control the hydraulic pressure on the basis of the estimation to maintain a predetermined belt slip condition. Thus, it is possible to stably maintain a predetermined belt slip condition during the belt slip control by accurately acquiring a change in the belt slip condition by monitoring the phase difference correlated with the belt slip condition. As a result, under the belt slip control by which the belt friction is stably reduced, it is possible to realize a targeted reduction in drive energy consumption.

Embodiment 2

An embodiment 2 is an example in which, as a limitation control of a change rate of the variable speed ratio, a method setting a limitation to a time constant on transmission time is adopted.

A constitution is first explained.

Figure 18:
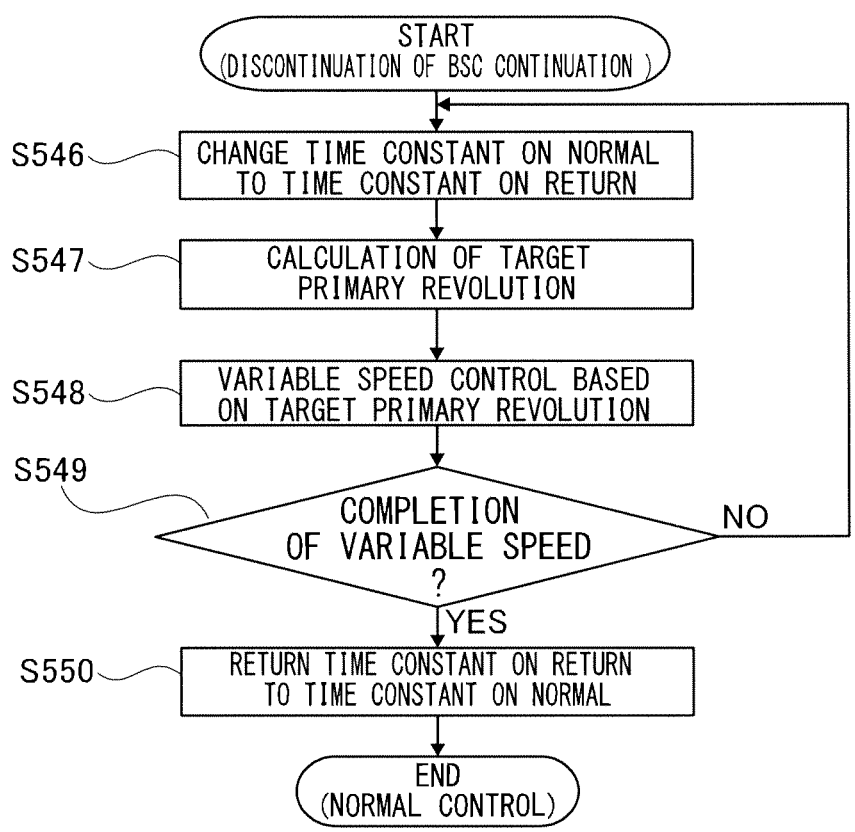
FIG. 18 is a flow chart showing a variable speed limitation process of a variable speed ratio setting a limitation to a time constant during the variable speed, of a return process to the normal control executed by a CVT control unit 8 in an embodiment 2.

FIG. 18 is a flow chart showing a transmission-speed restricting process of the variable speed ratio setting a limitation to the time constant on the transmission time, of a returning process to a normal control executed by a CVT control unit 8 according to the embodiment 2. Each of steps shown in FIG. 18 is explained as follows.

In step S546, a time constant used for a transmission control on normal time is changed to a time constant having a long delay time, used for a transmission control on return, and the flow proceeds to step S547. Here, the time constant on transmission at the time of the return is set to a time constant in which a delay of response to an actual torque is considered.

In step S547, subsequent to the change of the time constant in step S546, a target primary revolution is computed by use of the changed time constant, and the flow proceeds step S548.

In step D548, subsequent to the calculation of the target primary revolution in the step S547, the transmission control is performed based on the calculated target primary revolution, and the flow proceeds to step S549.

In step S549, subsequent to the transmission control in step S548, a determination is made on whether the transmission control based on the target primary revolution is completed, in other words whether an actual primary revolution reaches the target primary revolution. In the case of Yes (the transmission control is completed), the flow proceeds to step S550, in the case of No (during the change gear control), the flow proceeds to step S546.

In step S550, subsequent to the determination that the change gear control is completed in step S549, the time constant using for the transmission control at the time of return is returned to the time constant using for the transmission control on normal, and the flow proceeds to END. Meanwhile, because other structure of the embodiment 2 is similar to that of the embodiment 1 as shown in FIGS. 1 to 10, further description and illustration are omitted.

Next, operation is explained.

[Limit Operation of Time Constant on Transmission in Return Control from BSC to Normal Control]

The BSC continuation is discontinued, and when the flow is shift to the return control to the normal control, the flow from step S546→step S547→step S548 to step S5449 in the flowchart in FIG. 18 is repeated until the completion of the transmission. That is, in step S546, a time constant using for the transmission control on the normal time is changed to a time constant having a long delay time for using for transmission control on the return time. In the next step S547, the target primary revolution is calculated by use of the changed time constant, in the next step S548, the transmission control is achieved based on the calculated target primary revolution. In this way, because the transmission control is performed by use of the time constant having a delay longer than that of the time constant on the normal time, the change gradient of the target variable speed ratio in the target change ratio which is finally produced is gentle more than that of the transmission control using the time constant on the normal time.

Figure 19:
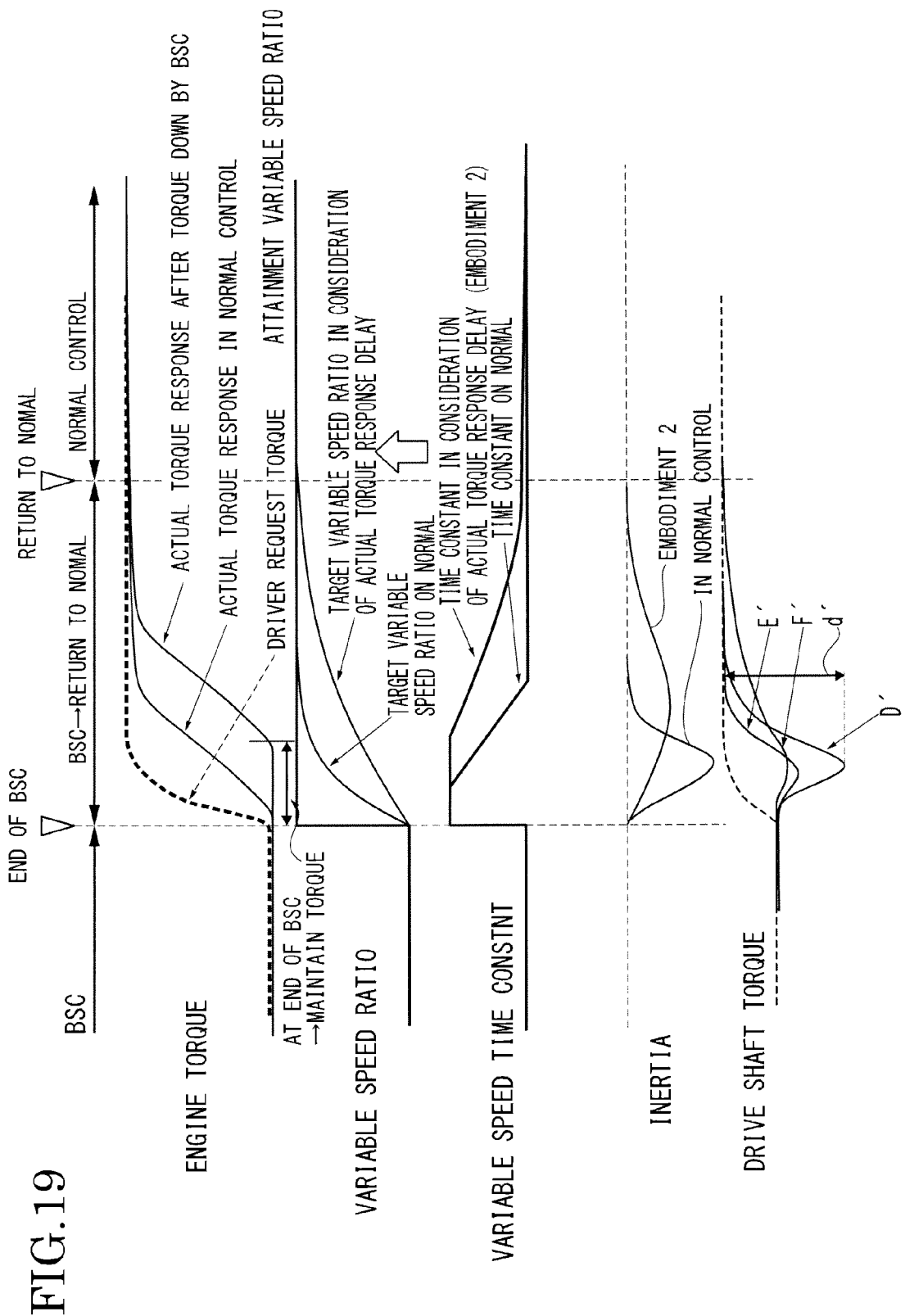
FIG. 19 is a time chart showing a characteristic of each of an engine torque, a target primary revolution, an inertia torque, and a drive shaft torque by a torque delay and a time constant limiter on variable speed adopted in a return control in the embodiment 2.

A return control operation by the torque delay and the primary revolution-increasing rate limiter adopted in the embodiment 2 is described with reference to a time chart as shown in FIG. 19.

An engine torque characteristic is first explained. In the engine torque characteristic in an area from the BSC completion to the normal returning, a driver request torque shows a stepwise rising characteristic, and the engine torque characteristic depending on an actual torque response on the normal time in which a torque limit control is not performed shows a characteristic in which a torque rises immediately after the BSC completion. On the contrary, the engine characteristic in the embodiment 2 shows that the torque is maintained for a while after the BSC completion, thereafter the torque rises belatedly, as shown in the actual torque response after the torque down by the BSC.

Next, a target variable speed ratio characteristic and an inertia torque characteristic are explained. In a target variable speed ratio characteristic in an area from the BSC completion to the normal returning, an attainment transmission characteristic is given by a step characteristic at the time of the BSC completion, and in a target transmission characteristic on the normal time where a limit control for a primary revolution-rising rate is not performed, a response rate depends on the time constant characteristic on the normal time, and the target transmission characteristic rises toward the attainment variable speed ratio with a large gradient immediately after the BSC completion. On the contrary, the target variable speed ratio characteristic in the embodiment 2 shows that the response rate depends on the time constant in consideration of the actual torque response delay and shows a characteristic that gradually rises toward the attainment variable speed ratio with a gentle gradient more than that of the normal time. In addition, the inertia torque characteristic on the normal time is sharply reduced from the BSC completion whereas the inertia torque characteristic in the embodiment 2 is gently reduced for a period from the time of the BSC completion to the time of the normal returning.

Finally, a drive shaft torque characteristic and an inertia torque characteristic are explained. The drive shaft torque characteristic when the torque delay and the primary revolution-rising rate-limit control are not performed together (normal time) shows a characteristic that a torque reduces somewhat more than that in after transmission initiation and before the transmission initiation, thereafter the torque increases because the inertia torque has a large peak, but the engine torque has a rapid response, as shown by an E' characteristic in FIG. 19. If the drive shaft characteristic is obtained, a shock due to the transmission does not occur.

A drive shaft characteristic in which the torque delay is performed, but the primary revolution rising rate-limit control is not performed has a characteristic having a drop d' that, by generating an engine torque input delay due to the torque delay while maintaining the inertia characteristic which is the same as the normal time, the torque is significantly reduced more than that in after the transmission initiation and before the transmission initiation, and thereafter the torque increases, as shown in a D' characteristic in FIG. 19. When the change of the drive shaft torque occurs, a driver feels a shock to lead degeneration of driving performance and comfort.

On the contrary, the drive shaft torque characteristic in the embodiment 2 in which the torque delay and the time constant limit control on transmission are together performed has a characteristic that, if the engine torque input is belated for the torque delay, because the peak of the inertia torque can be reduced by the primary revolution rising rate-limit control, the torque is somewhat reduced more than that in after the transmission initiation and before the transmission initiation, and thereafter the torque increases, as shown in an F' characteristic in FIG. 19. That is to say, when the torque delay and the primary revolution rising rate-limit control are performed simultaneously, it is determined that a shock is restricted.

As mentioned above, at the time of the return control from the belt slip control to the normal control, with the performance of the torque limit control, by achieving a control to provide a limitation to a change rate of the primary revolution, a change of the revolution inertia at the time of the transmission initiation is reduced, the fact that the drive shaft torque is reduced more than that in before transmission initiation can be restricted, consequently, it is possible to prevent unnecessary shock (deceleration feeling) from giving to a driver. Meanwhile, because other operation is similar to that of the embodiment 1, a description is omitted.

Next, advantageous effects are explained.

In the control device for the belt-type continuously variable transmission 4 as shown in the embodiment 2, the following advantageous effects can be obtained in addition to the effects (1) to (6) in the embodiment 1.

(10) The normal control-return control means (step S5) limits the change rate of the variable speed ratio by setting the time constant adjusting a time required to the change of the variable speed ratio to the time constant having the response delay rather than the time constant on the normal transmission control (FIG. 18). Therefore, it is possible to effectively prevent a shock (deceleration feeling) from occurring by controlling the change of the target variable speed ratio to follow the response delay of the actual torque in adding the limitation to the transmission rate of the variable speed ratio.

Embodiment 3

An embodiment 3 is an example in which a method to hold a variable speed ratio at the time of the completion of the belt slip control by a predetermined time, as a limitation control of a change rate of a variable speed rate is adopted.

A constitution is first explained.

Figure 20:
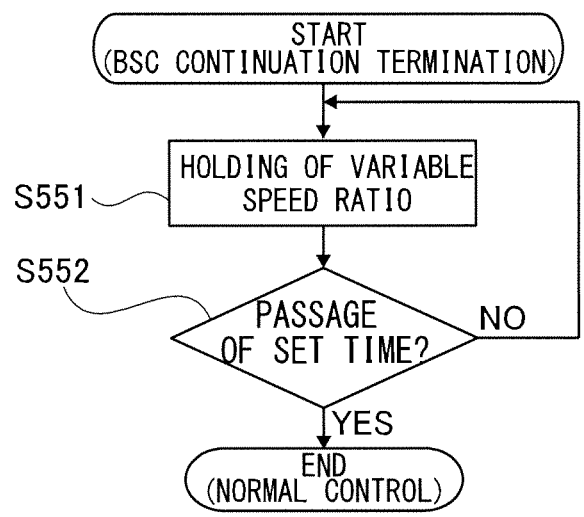
FIG. 20 is a flow chart showing a variable speed limitation process for a variable speed ratio by a variable speed delay, of a return process to the normal control executed by a CVT control unit 8 in an embodiment 3.

FIG. 20 is a flow chart showing a variable speed-limitation process of a variable speed ratio by a transmission delay, of a return process to a normal control, executed by a CVT control unit 8 in the embodiment 3. Each of steps shown in FIG. 20 is explained hereinafter.

In step S551, when a BSC continuation is aborted, the variable speed ratio at the time of the completion of the BSC control is maintained, and the flow proceeds to step S552.

In step S552, following the keeping of the variable speed ratio in step S551, whether a set time is lapsed is determined, if it is Yes, the flow proceeds to END, if it is NO, the flow returns to step S551. Here, the set time holding the variable speed ratio is set to a time approximately aligning with a time at which an input torque at the time of the completion of the BSC control is maintained by a torque limit control. Meanwhile, because the other structure of the embodiment 3 is similar to that of the embodiment 1 as shown in FIGS. 1 to 10, illustration and description thereof are omitted.

Next, operation is explained.

[Limit Operation of Time Constant on Variable Speed in Return Control from BSC to Normal Control]

The BSC continuation is discontinued, and when the flow is shift from the return control to the normal control, the flow from step S551 to step S552 in the flowchart in FIG. 20 is repeated until a set time lapses. In other words, in step S551, the variable speed ratio at the time of completion of the BSC control is maintained. In the next step S552, whether or not the set time lapses is determined, and the variable speed ratio at the time of completion of the BSC control is maintained until the set time lapses. When the set time lapses, the normal variable speed control is lately initiated (variable speed delay).

A return control operation by the torque delay and the variable speed delay adopted in the embodiment 3 is explained hereinafter with reference to a time chart as shown in FIG. 21.

An engine torque characteristic is first explained. In the engine torque characteristic in an area from the BSC comple-tion to the normal return, a driver request torque shows a stepwise rising characteristic, and the engine torque characteristic depending on an actual torque response on the normal time in which a torque limit control is not performed shows a characteristic in which a torque rises immediately after the BSC completion. On the contrary, the engine characteristic in the embodiment 3 shows a characteristic that the torque is maintained for a while after the BSC completion, thereafter the torque rises belatedly, as shown in the actual torque response after the torque down by the BSC.

Next, a target variable speed ratio characteristic and an inertia torque characteristic are explained. A target primary revolution characteristic in an area from the BSC completion to the normal return shows that an attainment variable speed ratio characteristic is given by a step characteristic at the time of the BSC completion, and a target variable speed ratio characteristic on the normal time where a variable speed delay control is not performed shows a characteristic that rises toward an attainment variable speed ratio with a large gradient immediately after the BSC completion. On the contrary, the target variable speed ratio characteristic in the embodiment 3 shows a characteristic that the variable speed ratio is kept while the engine torque is maintained and rises toward the attainment variable speed ratio with a large gradient immediately after the torque maintaining time lapses. In addition, the inertia torque characteristic on the normal time is sharply reduced from the time of the BSC completion whereas the inertia torque characteristic in the embodiment 3 is sharply reduced from a time at which the variable speed-keeping time lapses.

Finally, a drive shaft torque characteristic and an inertia torque characteristic are explained. The drive shaft torque characteristic when the torque delay and the primary revolution-rising rate-limit control are not performed together (normal time) shows that a torque reduces somewhat more than that in after transmission or variable speed initiation and before the transmission initiation, thereafter the torque increases, because the inertia torque has a large peak, but the engine torque has a rapid response, as shown by an E" characteristic in FIG. 21. If the drive shaft characteristic is obtained, a shock due to the transmission or variable speed does not occur.

A drive shaft characteristic in which the torque delay is performed, but the primary revolution-rising rate-limit control is not performed has a characteristic having a drop d" that, by generating an engine torque input delay due to the torque delay while maintaining the inertia characteristic which is the same as the normal time, the torque is significantly reduced more than that in after the transmission initiation and before the transmission initiation, and thereafter the torque increases, as shown in a D" characteristic in FIG. 21. When the change of the drive shaft torque occurs, a driver feels a shock to lead degeneration of driving performance and comfort.

On the contrary, the drive shaft torque characteristic in the embodiment 3 in which the torque delay and the primary revolution-rising rate-limit control are together performed has a characteristic that, because the transmission or variable speed is initiated in accordance with the delay of the torque input by the variable speed delay, the torque is somewhat reduced more than that in after the transmission initiation and before the transmission initiation, and thereafter the torque increases, as shown in an F" characteristic in FIG. 21. That is to say, when the torque delay and the primary revolution-rising rate-limit control are performed simultaneously, it is determined that a driver's shock is restricted.

As mentioned above, at the time of the return control from belt slip control to the normal control, by achieving the variable speed delay control with performing the torque limit control, a change of the revolution inertia is reduced, and the reduction of the input torque to the belt-type continuously variable transmission can be restricted, consequently, it is possible to prevent unnecessary shock (deceleration feeling) from giving to a driver. Meanwhile, because other operation is similar to that of the embodiment 1, a description thereof is omitted.

Next, advantageous effects are explained.

In the control device for the belt-type continuously variable transmission mechanism 4 as shown in the embodiment 3, the following advantageous effects can be obtained in addition to the effects (1) to (6) in the embodiment 1.

(11) The normal control-return control means (step S5) limits the change rate of the variable speed ratio by holding the variable speed ratio at the time of the belt slip control completion for a predetermined time from the time of the belt slip control completion (FIG. 20). Therefore, it is possible to effectively prevent the shock (deceleration feeling) from occurring, because it is possible to achieve a management for a timing starting the variable speed in accordance with the delay of the torque input by the variable speed delay, in adding the limitation to the change rate of the variable speed ratio.

Although the control device and the control method for the belt-type continuously variable transmission according to the present invention have been described in terms of the exemplary embodiments 1 to 3, they are not limited thereto with respect to a concrete structure. It should be appreciated that design variations or additions can be made without departing from the scope of the present invention as defined by the following claims.

In the embodiments 1 to 3, there has been described an example where a hydraulic pressure circuit of a single side adjusting type controlled by a step motor is used for the transmission hydraulic pressure control unit 7. However, another single side adjusting type or both sides adjusting type transmission hydraulic pressure control unit can be also applied.

In the embodiments 1 to 3, there has been described an example where only the secondary hydraulic pressure is oscillated. However, for example, the primary hydraulic pressure together with the secondary hydraulic pressure can be concurrently oscillated at the same phase by a direct acting control system. Alternatively, the primary hydraulic pressure together with the secondary hydraulic pressure can be oscillated at the same phase by oscillating the line pressure.

In the embodiments 1 to 3, there has been described an example of the oscillation means in which proper oscillation components are given to the command secondary hydraulic pressure. Alternatively, the proper oscillation components may be given to solenoid current values.

In the embodiments 1 to 3, there has been described an example of the torque limit control in which the input torque at the time of completion of belt slip control is held by the predetermined time. However, for example, an example of a torque limit control in which a slight torque raising is allowed may be used.

There is shown an example in which a limitation is given to the change rate of the target primary revolution, as the limitation control of the change rate of the variable speed ratio, in the embodiment 1, there is shown an example in which a limitation is given to the time constant on the variable speed time, as the limitation control of the change rate of the variable speed ratio, in the embodiment 2, and there is shown an example in which the variable ratio at the time of the completion of the belt slip control is held by a predetermined time, as the limitation control of the change rate of the variable speed ratio, in the embodiment 3. However, an example combining the two methods of the methods as shown in the embodiments 1 to 3, or an example combining the three methods as shown in the embodiments may be used.

The embodiments 1 to 3 have shown an application example to an engine vehicle installing a belt-type continuously variable transmission. The present invention is also applicable to a hybrid vehicle installing a belt-type continuously variable transmission, an electric vehicle installing a belt-type continuously variable transmission and the like. In short it is applicable to any vehicle incorporating a belt-type continuously variable transmission which performs a hydraulic pressure transmission control.

EXPLANATION OF REFERENCE NUMBERS 1 engine
2 torque converter
3 forward/backward drive switch mechanism
4 belt-type variable transmission mechanism
40 transmission input shaft
41 transmission output shaft
42 primary pulley
43 secondary pulley
44 belt
45 primary hydraulic pressure chamber
46 secondary hydraulic pressure chamber
5 final reduction mechanism
6, 6 drive wheels
7 transmission hydraulic pressure control unit
70 oil pump
71 regulator valve
72 line pressure solenoid
73 transmission control valve
74 decompression valve
75 secondary hydraulic pressure solenoid
76 servo link
77 transmission command valve
78 step motor
8 CVT control unit
80 primary revolution sensor
81 secondary revolution sensor
82 secondary hydraulic pressure sensor
83 oil temperature sensor
84 inhibitor switch
85 brake switch
86 accelerator opening sensor
87 other sensors and switches
88 engine control unit

The invention claimed is:

1. A control method for a belt-type continuously variable transmission configured to perform a belt slip control in which a belt slip condition among a primary pulley, a secondary pulley, and a belt is controlled by a hydraulic pressure, the belt slip control of the control method comprising:

oscillating the hydraulic pressure and monitoring a phase difference calculated on the basis of a multiplication value of an oscillation component included in an actual hydraulic pressure and an oscillation component included in an actual variable speed ratio to estimate the belt slip condition;

controlling the hydraulic pressure to maintain a predetermined belt slip condition by reducing the hydraulic pressure to be lower than a hydraulic pressure in a time of a normal control, the hydraulic pressure being controlled based on the estimation; and limiting an input torque-change rate in which an input torque to the belt-type continuously variable transmission changes in an increasing direction, the rate being limited until the hydraulic pressure rises to a hydraulic pressure in which the input torque to the belt-type continuously variable transmission is not excessive relative to a belt clamp force, the limitation being performed for a predetermined period from an initiation of return to the normal control, when returning to the normal control by an increment in the input torque to the belt-type continuously variable transmission.

2. A control method for a belt-type continuously variable transmission configured to perform a belt slip control in which a belt slip condition among a primary pulley, a secondary pulley, and a belt is controlled by a hydraulic pressure, the belt slip control of the control method comprising:

oscillating the hydraulic pressure;

controlling the hydraulic pressure to maintain the belt slip condition by reducing the hydraulic pressure to be lower than a hydraulic pressure in a time of a normal control on the basis of a phase difference between an oscillation component included in an actual hydraulic pressure and an oscillation component included in an actual variable speed ratio; and when returning to the normal control by an increment in an input torque to the belt-type continuously variable transmission, limiting by the belt slip control an input torque-change rate in which the input torque to the belt-type continuously variable transmission changes in an increasing direction, the rate being limited until the hydraulic pressure rises to a hydraulic pressure in which the input torque to the belt-type continuously variable transmission is not excessive relative to a belt clamp force, the limitation being performed for a predetermined period from an initiation of the return to the normal control.

* * * * *